United States Patent [19]

Walsh

[11] Patent Number: 5,645,746

[45] Date of Patent: Jul. 8, 1997

[54] USE OF PTC DEVICES

[75] Inventor: Malcolm R. Walsh, Redwood City, Calif.

[73] Assignee: Raychem Corporation, Menlo Park, Calif.

[21] Appl. No.: 566,588

[22] Filed: Nov. 30, 1995

Related U.S. Application Data

[63] Continuation of Ser. No. 110,593, Aug. 23, 1993, abandoned.

[51] Int. Cl.$^6$ ........................................... H05B 1/02
[52] U.S. Cl. .................. 219/505; 219/203; 219/508; 219/483; 219/485; 361/27; 361/106
[58] Field of Search ..................................... 219/202, 481, 219/483, 484, 485, 486, 501, 508, 509, 504, 505; 361/106, 24, 27

[56] References Cited

FOREIGN PATENT DOCUMENTS 40 15 816  5/1990  Germany .

OTHER PUBLICATIONS

International Search Report for PCT/US94/09392, mailed Dec. 16, 1994.

Patent Abstracts of Japan vol. 13, No. 465 (an abstract of Japanese Patent Publication No. 01 182 143).

Primary Examiner—Mark H. Paschall
Attorney, Agent, or Firm—Herbert G. Burkard; Timothy H. P. Richardson

[57] ABSTRACT

Use of PTC circuit protection devices in motor vehicle wiring systems. The devices can replace some or all of the fuses conventionally used. Preferred devices contain PTC conductive polymers. Because the PTC devices can be reset without physical access to them, the wiring system can be arranged more efficiently and more economically. For example, the size of at least some of the wires of the harness can in many cases be reduced.

52 Claims, 10 Drawing Sheets

USE OF PTC DEVICES

This application is a file wrapper continuing application of application Ser. No. 08/110,593, filed Aug. 23, 1993 now abandoned.

BACKGROUND OF THE INVENTION

1. Field of the Invention

This invention relates to positive temperature coefficient (PTC) circuit protection devices.

2. Introduction to the Invention

PTC circuit protection devices are well known. Under normal operating conditions of the circuit, a PTC circuit protection device is in a low temperature, low resistance state. However, if a fault occurs (eg. if the current through the PTC device increases excessively, and/or the ambient temperature around the device increases excessively, and/or the normal operating current is maintained for more than the normal operating time), then the PTC device will be "tripped", i.e. converted into a high temperature, high resistance state such that the current in the circuit is reduced to a safe level. Generally, the PTC device will remain in the tripped state, even if the fault is removed, until the device has been disconnected from the power source and allowed to cool. In a batch of PTC devices made by the same manufacturing process, uncontrollable variations in the process can cause substantial variation in the conditions which will trip any individual device. The largest steady state current which will not cause any of the devices in the batch to trip is referred to herein as the "pass current" ($I_{PASS}$) or "hold current", and the smallest steady state current which will cause all of the devices to trip is referred to as the "trip current" ($I_{TRIP}$). In general, the difference between $I_{PASS}$ and $I_{TRIP}$ decreases slowly as the ambient temperature increases. Depending on the particular type of device, $I_{TRIP}$ may for example be 1.5 to 2.5 times $I_{PASS}$ at 20° C. For any individual device, the pass current and the trip current are the same. However, in this specification, reference is made to a PTC device having an $I_{PASS}$ and a different $I_{TRIP}$, because as a practical matter, the manufacturer of a wiring system must make use of PTC devices taken from a batch of such devices. Generally, the higher the ambient temperature, the lower the pass current and the trip current. This phenomenon is referred to as "thermal derating", and the term "derating curve" is used to denote a graph of temperature against pass current.

Generally, the way in which pass current changes with ambient temperature i.e. the shape of the derating curve, depends mainly on the PTC material, while the pass current at any particular temperature depends also on the other factors which determine the resistance and the thermal transfer characteristics of the device. Thus, using a given PTC material, it is possible to make devices which have different pass currents but derating curves of the same shape. But to make a PTC device having a derating curve of a different shape, a different PTC material must be employed.

PTC circuit protection devices contain PTC elements which may be composed of a PTC conductive polymer or a PTC ceramic, eg. a doped barium titanate. PTC ceramics have been used commercially for several decades, but they are brittle and their resistivities are higher than is desirable. Over the last decade, PTC conductive polymers which do not suffer from these disadvantages have been developed, and the use of circuit protection devices based on them has increased rapidly. Reference may be made for example to U.S. Pat. Nos. 4,237,441, 4,255,698, 4,238,812, 4,315,237, 4,426,633, 4,780,598, 4,800,253, 4,907,340, and 5,089,801, and copending commonly assigned U.S. applications Ser. Nos. 07/893,626, 07/894,119 and 07/910,950. The disclosure of each of those patents and applications is incorporated herein by reference for all purposes.

In automobiles and other road vehicles, there is always a risk that in one way or another, e.g. through an insulation failure, one or more of the insulated wires or other components of the electrical wiring system, e.g. connectors, splices, connection blocks, switches and operative devices, will be accidentally grounded (i.e. connected, e.g. via the chassis or bodywork of the vehicle, to the ground pole of the battery), thus creating a short circuit current which, if maintained for too long, can overheat the wire (or another component in the short circuit), and thus cause damage, e.g. as a result of melting the insulation on the wire. It is conventional, in order to prevent such damage, to protect each of the wires by a fuse which, if the wire is accidentally grounded, will blow before the wire can overheat. The fuses are generally placed in fuse boxes which are readily accessible, so that blown fuses can be easily replaced. The system may also contain one or more circuit breakers for substantially the same reason; however, circuit breakers generally cost more than fuses and tend to lose their calibration (i.e. the current required to trip them changes with time and usage).

The number of operative electrical devices in automobiles and other road vehicles has risen sharply over recent years, and is still increasing. For example, many automobiles now contain electric motors to control windows, seats and door locks, and a wide range of sensors and other diagnostic apparatus, as well as interior and exterior lights. With the large number of electrical devices now present in automobiles, it is impractical to have a separate fuse to protect the wiring for each device. Many of the fuses, therefore, must protect the wiring for a number of different devices. Such shared fuses must have a current-carrying capacity substantially greater than the sum of the maximum current requirement of each of those devices, taking into account also any transient inrush currents which any electric motors, lamps or other devices may draw when first switched on. The relatively cheap fuses conventionally used in automobiles have very rapid response times, and when using such fuses, transient inrush currents often determine the capacity of the fuse, which may need to be larger than that required to handle steady state currents. Consequently, it is necessary to use wires having a still greater current-carrying capacity, even in branches which serve only devices having much smaller current requirements, and even though the fuse capacity may be determined by inrush currents which would not damage the wire.

Even with such shared fuses, however, and even with two or more fuse boxes at different locations in the vehicle, it is a significant design problem to find appropriate, accessible location(s) for the fuse box(es) without taking up space which is needed for other purposes. In addition, the use of shared fuses results in disconnection of all the devices protected by that fuse, even if only the wiring to one of them is shorted out. Present wiring systems are, therefore, expensive; they are difficult to install and maintain; they add significantly to the weight of the vehicle and, therefore, have an adverse effect on fuel consumption; and they result in disconnection of groups of devices, whereas separate wiring for each of the devices would result in disconnection of only one of the devices.

It has been proposed to replace fuses in a conventional automobile wiring harnesses by PTC devices, in order to take advantage of the fact that a PTC device can be reset without physical access to it, thus making it possible to place the PTC devices in locations which are inaccessible (and which would not, therefore be satisfactory for conventional fuses); see published German Patent Application No. P 409 15 816.

SUMMARY OF THE INVENTION

I have now discovered, in accordance with the present invention, that when at least some of the electrical wiring in the wiring system of a vehicle is protected by PTC circuit protection devices, substantial advantages can be obtained. By the time/current combinations which will trip the PTC devices to the time/current combinations which will damage the wiring or other components which they protect. For any particular type of wiring, therefore, it is usually possible to design a PTC device which will protect the wiring but, unlike a fuse, will not be tripped by transient inrush currents which will not damage the wiring. In particular, I have found that it is possible to reduce the required current-carrying capacity of some of the wiring, and/or some of the switches, connectors, splices, connection blocks or other components of the system, with a consequent reduction in material costs and/or weight.

Similar advantages can be obtained in similar electrical systems, for example those installed in airplanes and ships.

The present invention differs from the known use of PTC circuit protection devices in automobiles in order to protect operative electrical devices, i.e. devices which are switched on by the vehicle operator in order to produce a predetermined effect, e.g. window lift motors. In that known use, the PTC device protects the operative device (eg. from overheating) and is usually very close to, or integrated into, the protected device; it does not provide protection against a grounding fault to the wiring which leads to the protected device, such protection being provided by a conventional fuse or circuit breaker (whose function, in accordance with the present invention, can be directly or indirectly replaced by one or more PTC devices). For the avoidance of confusion, a PTC device which is used, in accordance with the present invention, in order to protect wiring, a switch, or other component which is not an operative device, will be referred to herein as a branch PTC device or BPTC device; and a PTC device which is used to protect an operative device in the known way will be referred to herein as an appointed PTC device or APTC device.

An important part of this invention is my recognition of the benefits that can be obtained by appropriate matching of the properties of the BPTC device and of the wiring or other components that it protects. The current-carrying capacity of insulated wires (and other electrical components) depends upon the size and duration of the current and the ambient temperature. It also depends upon the extent of the change in the insulation which the user regards as tolerable. For example, softening of the insulation might be regarded as intolerable, i.e. as "damage", for an insulated wire which was wrapped around a corner, but tolerable for the same wire passing through a straight duct. Users of insulated wires, e.g. manufacturers of automobile wiring harnesses, may for example stipulate that the temperature of the wire must not exceed a particular temperature, and this stipulation can be used to determine the maximum steady state current which the wire is permitted to carry at any particular ambient temperature, without damage to the insulation. In this specification, the term "damage current" is used to denote the smallest steady-state current which will cause "damage" to the insulated wire (or other electrical component), with damage being defined by criteria set by the manufacturer of the electrical system containing the wire. For example, in one case the damage current might be that which resulted in substantial softening of the insulation; in another case it might be that which caused fuming of the insulation; in another case it might be the maximum temperature which the wire is permitted to reach. The term "damage curve" is used herein to denote a graph of ambient temperature against damage current. For an insulated wire, the way in which the damage current changes with ambient temperature, i.e. the shape of the damage curve, depends mainly on the insulation material, while the damage current at any particular temperature depends also on the size of the wire and the thickness of the insulation. Thus, using a given insulation material, it is possible to make insulated wires which have different damage currents (usually determined in large measure by the size of the wire) but damage curves of the same shape. But to make an insulated wire having a damage curve of a different shape, a different insulating material must be employed. Generally speaking, the smaller the damage current of an insulated wire or other component, the cheaper and lighter it will be.

Appropriate correlation of the BPTC device and the insulated wiring (and other electrical components) requires that, throughout the temperature range of interest, e.g. −40° to +85° C. in most parts of automobiles, the pass current of the BPTC device is greater than the maximum possible steady state load current, and the trip current is less than the damage current of the wiring (and other electrical components). However, so far as possible, bearing in mind manufacturing procedures and tolerances, safety margins, and the need to accommodate transient currents higher than the maximum steady state load current, it is preferred that the margin between the maximum load current and the pass current should be small, and that the margin between the trip current and the damage current should also be small. In this way, the system can make use of lighter and/or less costly components.

The maximum load current in any part of a wiring system may decrease to some extent with increasing ambient temperature, but the extent of any such decrease is generally much less than the decrease with ambient temperature of the pass current of a BPTC device. The pass current of the BPTC device is, therefore, determined by the load current at the top end of the applicable ambient temperature range. With the PTC conductive polymers which are at present commercially available, the decrease in trip current with ambient temperature is substantially greater than the decrease in damage current with ambient temperature of insulated wires and other electrical components. Under these circumstances, the necessary characteristics of the insulated wire (or other component) are determined by the trip current of the BPTC device at the bottom end of the applicable ambient temperature range. Using improved PTC devices, with improved derating curves, smaller and/or lighter and/or less expensive components can be used. Thus the aim is (for any particular insulated wire) to use a BPTC device whose trip current derating curve is a little below the wire damage curve throughout the ambient temperature range of interest.

The electrical systems of the invention are installed in a road vehicle, an airplane or a ship and comprise (1) a source of electrical power;
(2) a supply connection means which is electrically connected to a first pole of the power source, and which has, at its weakest current-carrying point, a current-carrying capacity of $I_{LINK}$ amps, (3) a return connection means which is electrically connected to a second pole of the power source; and
(4) a plurality of branch circuits which are electrically connected in parallel between the supply connection means and the return connection means, at least two of the branch circuits being PTC-protected branch circuits, each of said branch circuits comprising
  (a) a branch PTC circuit protection device which
    (i) is electrically connected to the supply connection means directly or via at least one other PTC-protected branch circuit, and
    (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$;
  (b) an operative electrical device which is spaced apart from the branch PTC circuit protection device; and
  (c) an elongate PTC-protected branch connection means which
    (i) electrically connects the branch PTC device and the operative device, and
    (ii) has at all points a current-carrying capacity of at least $I_{DAMAGE}$ amps, $I_{DAMAGE}$ being more than $I_{TRIP}$;
  whereby, if the PTC-protected branch connection means is accidentally connected to the first and second poles of the power source by connections which do not include the operative device, there is created a fault circuit which contains the branch PTC circuit protection device and in which the current is initially greater than $I_{TRIP}$, thus causing the branch PTC device to trip and reduce the current to a steady state value substantially below $I_{TRIP}$;
wherein at least one of the following conditions is fulfilled:
  (A) in at least one of the PTC-protected branch circuits,
    (i) at all temperatures between 0° and 80° C., the $I_{PASS}$ of the branch PTC device in that PTC-protected branch circuit is at least 1.1 times $I_{LOAD}$, and
    (ii) at at least one temperature between −40° C. and 85° C., the $I_{PASS}$ of the branch PTC device in that PTC-protected branch circuit is at most 1.3 times $I_{LOAD}$,
  where $I_{LOAD}$ is the maximum steady state current in that PTC-protected branch circuit under normal operating conditions;
  (B) in at least one of the PTC-protected branch circuits,
    (i) at all temperatures between 0° and 80° C., the $I_{DAMAGE}$ of the branch connection means in that PTC-protected branch circuit is at least 1.1 times the $I_{TRIP}$ of the branch PTC device in that PTC-protected branch circuit, and
    (ii) at at least one temperature between −40° and 85° C., the $I_{DAMAGE}$ of the branch connection means in that PTC-protected branch circuit is at most 1.5 times the $I_{TRIP}$ of the branch PTC device in that PTC-protected branch circuit;
  (C) the total number of PTC-protected branch circuits is p, and at all temperatures between 0° and 80° C., in q of the PTC-protected branch circuits, where q is at least 0.1 p, the $I_{DAMAGE}$; of the branch connection means in that PTC-protected branch circuit is equal to or lower than $I_{22}$, where $I_{22}$ is the $I_{DAMAGE}$ of PVC-insulated copper wire having a cross-sectional area of 0.324 mm² (22 AWG); or
  (D) some of the PTC-protected branch connection means are insulated copper wires having an $I_{DAMAGE}$ equal to or less than $I_{22}$, and some of the PTC-protected branch connection means are insulated copper wires having an $I_{DAMAGE}$ greater than $I_{22}$, where $I_{22}$ is the $I_{DAMAGE}$ of a PVC-insulated copper wire having a cross-sectional area of 0.324 mm² (22 AWG), and at all temperatures between 0° and 80° C., the total length of the PTC-protected branch connection means having an $I_{DAMAGE}$ greater than $I_{22}$ is not more than x times the total length of the PTC-protected branch connection means in which $I_{DAMAGE}$ is equal to or less than $I_{22}$, where x is 10.

BRIEF DESCRIPTION OF THE DRAWING

The invention is illustrated in the accompanying drawings, in which.

Figure 1:
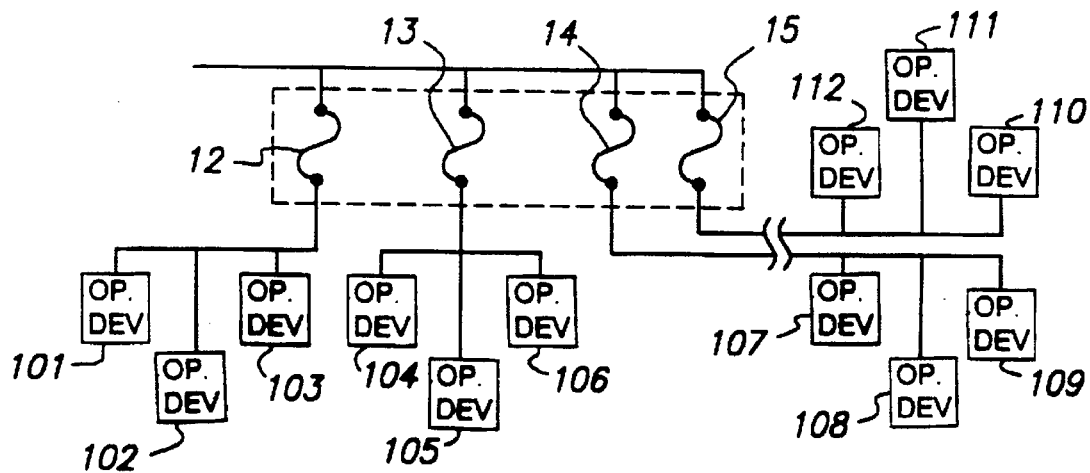
FIG. 1 is a conceptual representation of a part of an automobile electrical system of the known type.

In the drawings, the abbreviation OP DEV is used to denote an operative device, and the abbreviation JNCT BOX is used to denote a junction box.

DETAILED DESCRIPTION OF THE INVENTION

The system of the invention contains a plurality of branch circuits, at least two of which, and preferably many or even all of which, are PTC-protected branch circuits. The other branch circuits (if any) will normally be protected by other means, e.g. a fuse or a circuit breaker. Provision must be made for disconnecting the BPTC device from the power supply. This is preferably done by means of a switch which can be operated to disconnect at least one of the PTC-protected branch circuits. The term switch is used herein in a broad sense to denote any electrical device which achieves connection and disconnection, including make-and-break switches, relays, field effect transistors (FET's), including MOSFETS, JFETS, LFETS, and PFETS, bipolar devices including Darlingtons, pnp transistors and npn transistors, and silicon-controlled rectifiers (SCR's). An advantage of the present invention is that the presence of BPTC device often reduces the maximum current to which the switch can be exposed, and thus makes it possible to use a cheaper and/or smaller switch. Especially is this so when a single fuse has been replaced by two or more BPTC devices. It is often convenient for a switch and the BPTC device(s) which the switch controls to be located within a switch module, preferably within an insulating container (e.g. a box composed of an insulating polymer) which can be secured to the bodywork of the vehicle. The switch module can of course contain a plurality of such switches and BPTC devices.

The system will often contain at least one power distribution node which comprises a power input line and a plurality of outgoing lines, at least one of said outgoing lines, and preferably many or all of said outgoing lines, being electrically connected to the input line through a BPTC device. The number of BPTC devices can be the same as or less than the number of outgoing lines. The connections between the input lines and the outgoing lines can be made through a printed circuit board, a flexible printed circuit, a metal frett, or otherwise. The BPTC device is preferably mounted on, e.g. soldered or welded to, the circuit board, flexible printed circuit or metal frett. The BPTC devices and the connections between them and the input line and the outgoing lines are preferably contained within a container, particularly a container which is made of insulating material and which can be reopened and reclosed. The container can comprise vents and/or thermal insulation (inside and/or outside the container) which affect the time which the PTC device(s) take to trip, and which also help to ensure that the PTC device(s) therein do not trip as a result of overheating which has nothing to do with the electrical system. The BPTC devices can be offset so as to reduce the extent to which heat is transferred between them. For example if the BPTC devices are planar, they can be mounted parallel to each other and positioned, if space permits, so that adjacent devices overlap, when viewed at right angles to the plane of the devices, by at most 75%, preferably at most 50%, of the area of the smaller device (if their areas are different), for example so that they do not overlap at all.

The branch PTC-protected circuits can be connected to the supply connection directly or through one of a plurality of subsidiary supply means which are electrically connected to the principal supply means in parallel with each other. These subsidiary supply means make it possible to avoid a multiplicity of wires which have to be routed over relatively long distances, especially when the operative devices are controlled by relays which respond to signals generated at a different location. Often at least one of said subsidiary supply means (i) contains a subsidiary circuit protection device which is the weakest current-carrying point in the subsidiary supply means and which is converted into a high resistance state if the current in the subsidiary supply means exceeds a value $I_{SUB}$ amps and thus reduces the current to a value substantially below $I_{SUB}$, and (ii) is connected to a plurality of PTC-protected branch circuits, in each of which $I_{PTC}$ is less than $I_{SUB}$.

Like the systems disclosed in published German Patent Application No. P 40 15 186, the systems of the present invention provide greater freedom to design the physical and electrical layout of the system (the so-called "system architecture"). Thus in a conventional system, the requirement for accessibility of fuse boxes generally sets a practical upper limit of five or less on the number of locations at which fuse boxes are located (there may of course be two or more fuse boxes adjacent to each other at a single location). In the systems of the invention, by contrast, the BPTC devices can be at a larger number of spaced-apart locations, for example at at least four spaced-apart locations, e.g. at six or more spaced-apart locations, which are typically separated from each other by a distance of at least 50 cm, with at least one, often at least two, of the locations being separated from at least one of the other locations by a distance which is at least 250 cm, often at least 300 cm. Through use of the present invention, at least some of the distances between the operative devices and the power distribution nodes which feed current to them can be much smaller than in a conventional system. Thus it is preferred that in systems of the present invention, if there are p PTC-protected branch circuits, then in at least 0.5 p, particularly at least 0.75 p, of those circuits, the length of the PTC branch connection means is less than 300 cm, more preferably less than 200 cm, particularly less than 100 cm.

Also as noted previously, another advantage which can result from the present invention is a reduction in the needed current-carrying capacity of some of the wiring or other components (e.g. switches, connectors, splices and connection blocks) of the system. This advantage is obtained by correlating the characteristics of the BPTC device with the characteristics of the other components and the ambient temperature of the air surrounding the electrical system, under both steady state and transient conditions. At all temperatures at which the system may operate, the pass current of the BPTC device in a PTC protected branch circuit must be more than the maximum steady state current drawn by the operative device(s) in that branch circuit, and the trip current of the BPTC device must be less than the steady state current which will cause substantial damage to the wire insulation (or any other component of the system) in that branch circuit. In addition (again at all temperatures at which the system may operate), the BPTC device must be converted to its tripped state in a time which is sufficiently short that the currents in the branch circuit, during the time it takes to trip the BPTC device, will not cause substantial damage to the wire insulation (or any other component of the system). Fulfillment of these conditions does not, however, necessarily make it possible to achieve the objective of reducing the cost and/or weight of the wiring or other electrical components of the system. To do this, it is necessary to select a BPTC device whose pass current ($I_{PASS}$) is not excessive having regard to the maximum expected load current ($I_{LOAD}$), and to select wiring (and/or other electrical components) whose damage current(s) ($I_{DAMAGE}$) is not excessive having regard to the trip current of the BPTC device ($I_{TRIP}$). The minimum level for $I_{PASS}$ is set by the need to ensure that the system is not subject to an unacceptable level of "nuisance tripping", i.e. tripping by transient or steady state currents which would not damage the wiring or other components of the system. Once this need has been met, however, any further increase in $I_{PASS}$ increases the minimum current-carrying capacity which is required in the wiring and other components. It is preferred, therefore, that at each temperature within the applicable ambient temperature range, e.g. 0° to 80° C., or −40° to +85° C., $I_{PASS}$ is at least 1.1 times, particularly at least 1.2 times, $I_{LOAD}$, and that at at least one temperature in the range, $I_{PASS}$ is at most 1.3 times, preferably at most 1.1 times, $I_{LOAD}$. The minimum current-carrying capacity of the wiring and other components is set by the value of $I_{TRIP}$, which is higher than, but corresponds to, $I_{PASS}$. Since a margin of safety is desirable, it is preferred that at all temperatures within the applicable ambient temperature range, $I_{DAMAGE}$ is at least 1.1 times, particularly at least 1.2 times $I_{TRIP}$. However, once a margin of safety exists, there is no reason, electrically speaking, to use wiring or other electrical components which are capable of carrying currents substantially higher than those which will trip the BPTC device, and in general, the less the current-carrying capacity of an electrical component, the cheaper and/or lighter it will be. In many cases, therefore, it is preferred to use wiring and/or other electrical components having, at at least one temperature within the applicable ambient temperature range, an $I_{DAMAGE}$ which is at most 1.5 times, particularly at most 1.3 times, $I_{TRIP}$. However, it should be noted that in some cases, insulated wire having such an $I_{DAMAGE}$ is of such small size that it may require special handling techniques.

In existing road vehicle systems (in which the power source is a battery, usually of a nominal 12 or 24 volts, for example an actual 12–14.7 or 24–29 volts, and the return connection means may be a separate wire and/or structural elements of the vehicle), insulated wires of 18 AWG or more are often used throughout the system. The insulation employed is often polyvinyl chloride (PVC) or crosslinked polyethylene, but more expensive insulation materials, e.g. polyesters and fluoropolymers, are sometimes used, particularly on wires which are likely to become very hot or to be exposed to gasoline or transmission fluids or other fluids which might damage conventional insulation. Through use of the present invention it is possible to replace at least some of the wiring by wires of a smaller gauge, e.g. 22 gauge or even less, and/or by wires having cheaper or thinner insulation.

Preferred systems of the present invention comprise at least one PTC-protected branch circuit in which at all temperatures between 0° and 80° C., preferably at all temperatures between −40° and +85° C., $I_{DAMAGE}$ is equal to or lower than $I_{22}$, where $I_{22}$ is the $I_{DAMAGE}$ of a conventional PVC insulated 22 AWG copper wire (cross-sectional area 0.324 mm$^2$). Preferably the system contains a plurality of such PTC-protected branch circuits. Thus in one embodiment, the system contains a total of p PTC-protected branch circuits, and at least 0.1 p, particularly at least 0.2 p, especially at least 0.5 p, of those circuits have PTC-protected branch connection means having an $I_{DAMAGE}$ which is equal to or less than $I_{22}$, for example PTC-protected branch connections means which consist of or contain 22 AWG insulated wires. In another embodiment, the total length of the PTC-protected branch connections means in which $I_{DAMAGE}$ is greater than $I_{22}$ is not more than 10 times, preferably not more than 5 times, particularly not more than 2 times, the total length of the PTC protected branch connection means in which $I_{DAMAGE}$ is equal to or greater than $I_{22}$.

An operative device in a PTC-protected branch circuit can be protected against damage by an APTC device which is connected in series with the operative device and is adjacent to (or forms a part of) that operative device. The APTC device can be tripped by excessive temperature or excessive current (including a current which lasts for an excessive time) or both.

The systems of the invention can also include diagnostic means which will indicate when a BPTC device is in a tripped condition and/or if it has been in a tripped condition but has been restored to a normal operating condition. Such diagnostic means preferably comprises a voltage sensor which senses the voltage across the BPTC device or at a point on the PTC-protected branch connection means. When the PTC-protected branch circuit is connected to the power supply, this voltage will be high (generally equal to the voltage of the power supply) under normal conditions but will drop sharply if the BPTC device is tripped. The sensor can for example generate a visible light signal, e.g. in a light-emitting diode (LED), or an electronic signal which can be fed to a computer. When there are a plurality of voltage sensors, the system can include means for sequentially scanning the sensors.

The BPTC devices used in this invention preferably comprise a PTC element which is composed of a conductive polymer (i.e. a composition which comprises a polymeric component and, dispersed in the polymeric component, a particulate conductive filler, preferably carbon black). PTC circuit protection devices based on PTC conductive polymer elements have become increasingly popular over the last ten or twelve years, as continuing developments have made it possible to reduce the size and resistance of such devices, while increasing their reliability and versatility to meet a wide range of physical and electrical requirements. The BPTC devices used in this invention generally have a resistance of less than 3 ohm, preferably less than 1 ohm, especially less than 0.25 ohm, at 23° C. Preferably they comprise two laminar electrodes, generally metal foil electrodes, with a laminar PTC element sandwiched between the electrodes. For further details of suitable BPTC devices, reference should be made to U.S. Pat. Nos. 4,237,441, 4,238,812, 4,315,237, 4,329,726, 4,426,663, 4,685,025, 4,689,475, 4,774,024, 4,800,253, 4,935,166, 5,089,801 and 5,178,797, the disclosures of which are incorporated herein by reference.

Referring now to the drawings, FIG. 1 is a conceptual representation of a part of an automobile electrical system of known type. The wiring which serves operative devices 101, 102 and 103 is protected by fuse 12. Similarly, the wiring for devices 104–106, 107–109, and 110–112, is protected by fuses 13, 14, and 15 respectively. All of the fuses are within a single, easily accessible fuse box, as indicated by the dashed lines, even though operative devices 107–109 and 110–112 are located a considerable distance from the fuse box.

Figure 2:
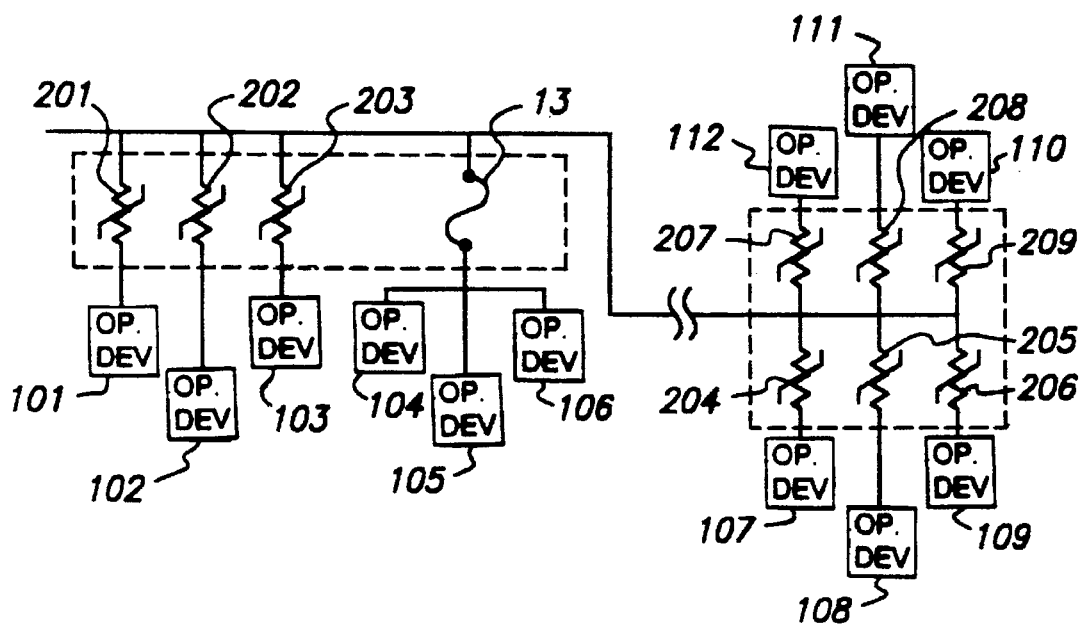
FIG. 2 is a conceptual representation of a part of an automobile electrical system of the present invention corresponding to FIG. 1.

FIG. 2 shows a part of a system of the invention which is similar to that shown in FIG. 1 but in which fuse 12 has been replaced by three branch PTC devices ("BPTC devices") 201, 202, and 203. BPTC device 201 protects only the wiring which serves operative device 101; BPTC device 202 protects only the wiring which serves operative device 102; and BPTC device 203 protects only the wiring which serves operative device 103. Fuses 14 and 15 have been replaced by BPTC devices 204–206 and 207–209 respectively, each BPTC device protecting the wiring for one of operative devices 107–112. Furthermore, the BPTC devices 204–209 are placed in a junction box (indicated by the dotted and dashed lines) which need not be easily accessible (since the BPTC devices are remotely resettable after correction of a fault, as opposed to conventional fuses, which must be manually replaced) and which can therefore be strategically placed for economy and convenience in manufacturing.

Figure 3:
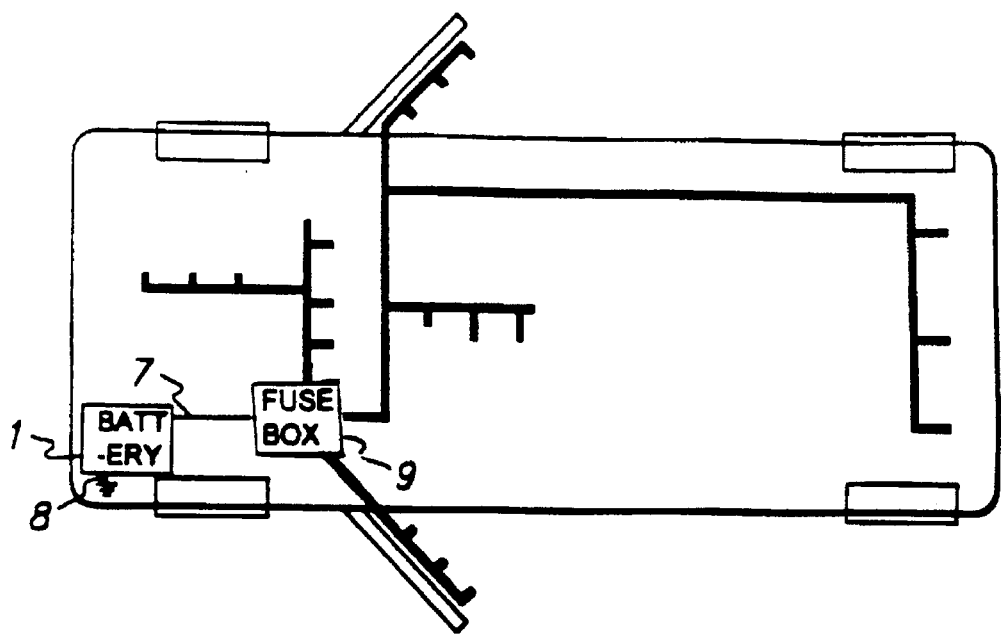
FIG. 3 is a conceptual representation of the physical lay-out (or "architecture") of an automobile electrical system of the known type.

FIG. 3 is a conceptual representation of the physical lay-out ("architecture") of an automobile electrical system of the known type. Battery 1 is connected by an unbranched supply connection means 7 to a fuse box 9 and by return connection means 8 to the bodywork of the automobile. The fuse box is easily accessible. A plurality of wires run from the fuse box to locations all around the automobile, each wire serving a single operative device or a relatively small number of operative devices.

Figure 4:
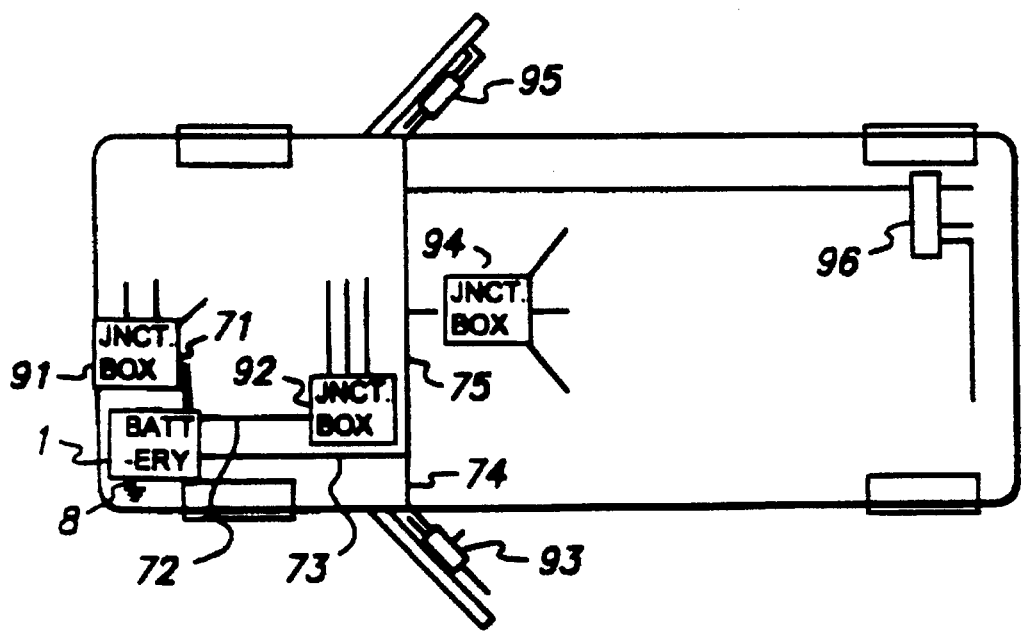
FIG. 4 is a conceptual representation of the architecture of an automobile electrical system of the present invention corresponding to FIG. 3.

FIG. 4 shows a system of the invention which is similar to that shown in FIG. 3, but in which the supply connection means 7 is replaced by a plurality of branches 71, 72, 73, 74, 75, etc., which are severally connected to junction boxes 91, 92, 93, 94, 95, and 96. Wires run from each junction box to operative devices located nearby. Within each junction box, the wires are connected through BPTC devices to a branch of the supply connection means. Because the BPTC devices operate remotely and do not need to be replaced, the junction boxes do not need to be easily accessible, and are placed at strategic locations, i.e. locations selected for ease of installation of the boxes and the wiring which runs to and from them, and for reduction of the amount of wire employed, having regard to the location of the operative devices served through a particular junction box.

Figure 5:
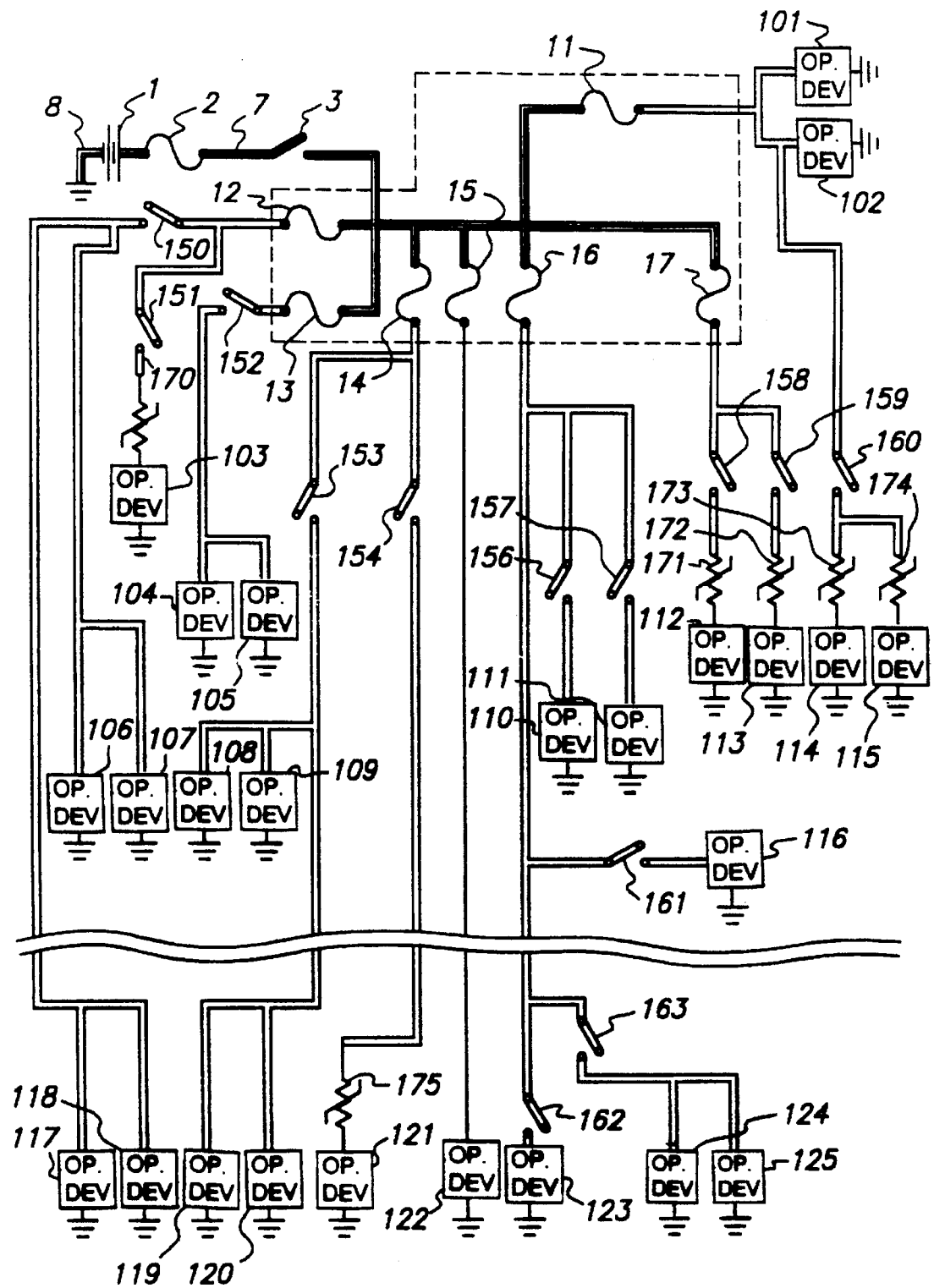
FIG. 5 is a conceptual circuit diagram of an automobile electrical system of the known type.

FIG. 5 is a conceptual circuit diagram of an automobile electrical system of known type. A battery 1 is placed at the front of the car and is connected by return connection means 8 to the bodywork of the car, and by supply connection means 7 to the remainder of the circuit. Fuse link 2 and ignition switch 3 form part of the connection means 7. The supply connection means 7 is connected to the rest of the circuit through fuses 11, 12, 13, 14, 15, 16 and 17, all of which are placed within a readily accessible fuse box indicated by the dashed lines in the Figure. Fuse 11 protects the wiring which leads to operative devices 101, 102 which are always on when the ignition switch 3 is on (e.g. sensors); it also protects the wiring which lead to operative devices 114 and 115 (e.g. electric motors) which are controlled by switch 160 and which are protected from by excessive currents by appointed PTC devices ("APTC devices") 173 and 174. Fuse 12 protects wiring which leads to operative devices 106 and 107 at the front of the automobile and 117 and 118 at the rear of the automobile (e.g. parking lights) which are controlled by switch 150. Fuse 12 also protects wiring which leads to operative device 103 (e.g. a horn) which is controlled by switch 151 and protected by APTC device 170. Fuse 13 protects wiring which leads to operative devices 104 and 105 (e.g. headlights) which are controlled by switch 152. Fuse 14 protects wiring which leads to operative devices 108 and 109 at the front of the automobile and operative devices 119 and 120 at the rear of the car (e.g. flashing emergency lights), all of which are controlled by switch 153. Fuse 14 also protects wiring which leads to operative device 121 (e.g. a rear window heater) which is controlled by switch 154 and protected by APTC device 175. Fuse 15 protects the wiring which leads to operative device 122 (e.g. a rear window wiper) at the rear of the automobile. Fuse 16 protects the wiring which leads to operative devices 123, 124 and 125 in the rear of the automobile, device 123 (e.g. a trunk light) being controlled by switch 162 and devices 124 and 125 (e.g. rear courtesy lights) being controlled by switch 163. Fuse 16 also protects the wiring which leads to operative devices 110 and 111 (e.g. seat motors) which are controlled by switches 156 and 157 respectively. Fuse 16 also protects the wiring which leads to operative device 116 (e.g. front courtesy lights) which is controlled by switch 161. Fuse 17 protects the wiring which leads to operative devices 112 and 113 (e.g. window lift motors) which are controlled by switches 158 and 159 respectively and protected by APTC devices 171 and 172 respectively.

The size of the wires in FIG. 5 is indicated by the number of parallel lines used to depict the wires. Thus the supply connection means has the largest size; the wiring to the operative device 122 has the smallest size; and all the other wiring has an intermediate size. The wiring to the operative device 122 can be of the smallest convenient size for the current requirements of the operative device 122, because it is the only wiring protected by the fuse 15, which has a current-carrying capacity corresponding to that device alone. The wiring and fuses leading to the other operative devices must be of larger size because they are determined by the sum of the requirements of the operative devices which they serve.

Figure 6:
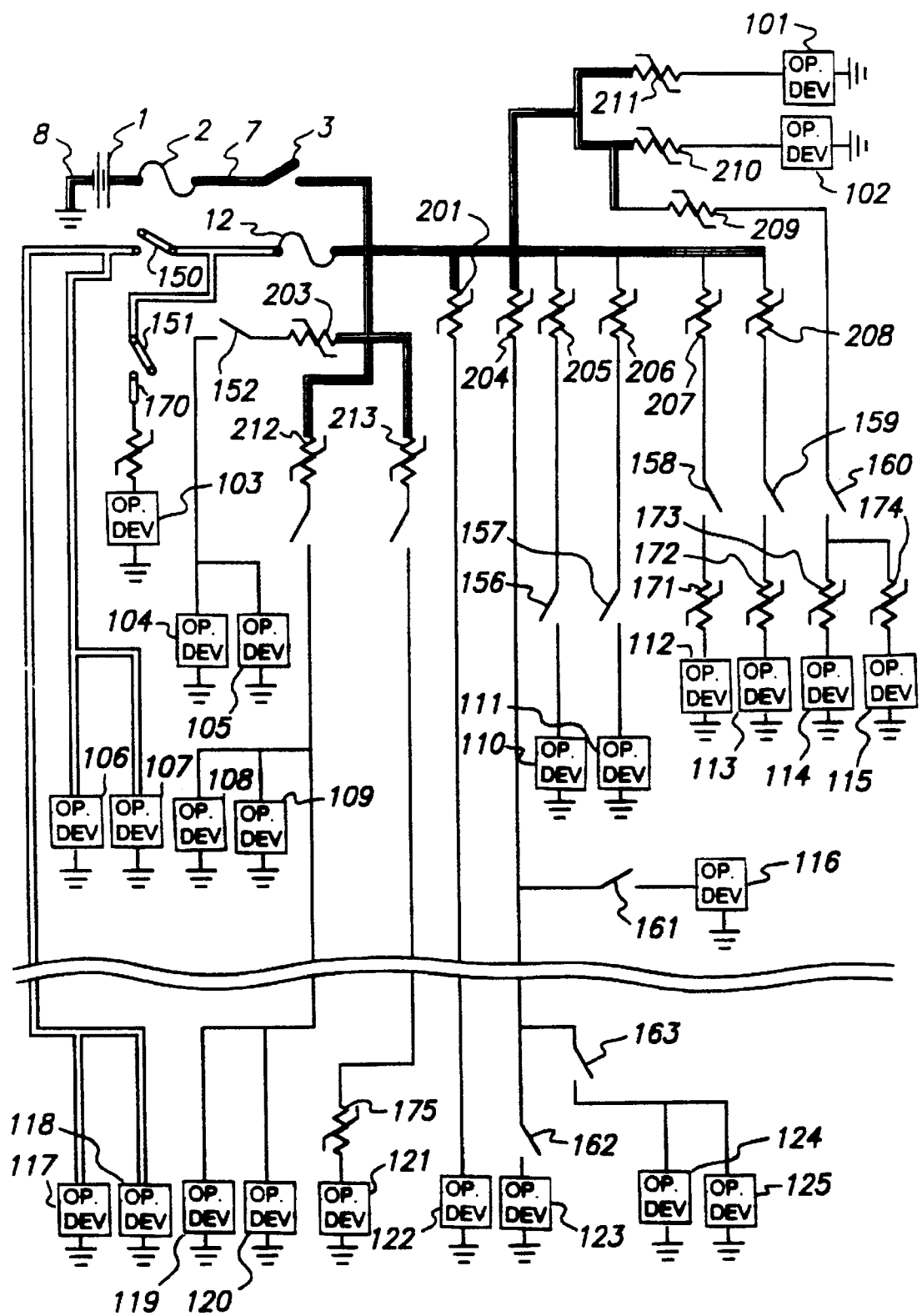
FIG. 6 is a conceptual circuit diagram of an electrical system according to the invention which corresponds to the known system of FIG. 5.

FIG. 6 is a conceptual circuit diagram of an electrical system according to the invention which corresponds to the known system of FIG. 5, but in which many of the fuses have been replaced by branch PTC devices ("BPTC devices"), and in many cases the wiring has been replaced by lower gauge wire. Fuse 11 has been replaced by three BPTC devices, BPTC device 209 protecting the wiring to operative devices 114 and 115, BPTC device 210 protecting the wiring to operative device 102, and BPTC device 211 protecting the wiring to operative device 101. Fuse 12 is unchanged. Fuse 13 has been replaced by BPTC device 203 having a pass current lower than the current which would blow fuse 13, because the BPTC device responds slowly to the transient currents generated when the headlights 104, 105 are first switched on. Fuse 14 has been replaced by two BPTC devices, BPTC device 212 protecting the wiring to operative devices 119 and 120 and BPTC device 213 protecting the wiring to operative device 121. Fuse 15 has been replaced by a single BPTC device 201. Fuse 16 has been replaced by four BPTC devices, BPTC device 204 protecting the wiring to operative devices 116, 123, 124 and 125, BPTC device 205 protecting the wiring to operative device 110, BPTC device 206 protecting the wiring to operative device 111, and BPTC device 207 protecting the wiring to operative device 112. Fuse 17 has been replace by BPTC device 208 protecting the wiring to operative device 113.

As in FIG. 5, the size of the wires is indicated by the number of parallel lines used to depict the wire. Where a fuse has been replaced by a number of BPTC devices, the size of the wiring protected by the BPTC devices can be reduced to a smaller size, because the number of operative devices served by each branch of the wiring has been reduced.

Figure 7:
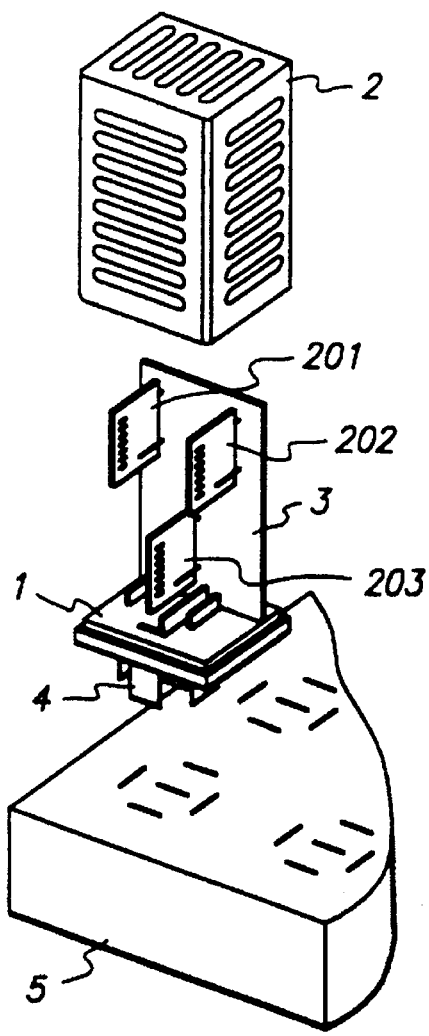
FIG. 7 is an illustration of a module for use in a system according to the invention which contains BPTC protection devices and which can be connected to a standard ISO junction box in an automobile electrical system.

FIG. 7 is an exploded schematic view of a module containing three BPTC devices 201, 202 and 203. The module contains a base 1 and a vented cap 2 which is a snap fit on the base. The BPTC devices are mounted on a printed circuit board 3 having traces thereon which connect the BPTC devices to prongs 4 which extend outwards from the base and which fit the sockets of a standard ISO junction box.

Figure 8:
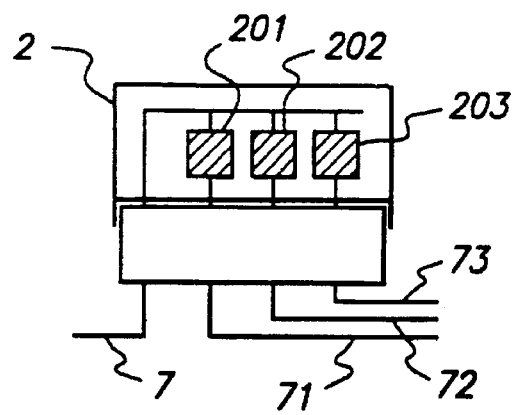
FIGS. 8 and 9 are illustrations of junction boxes for use in a system according to the invention which contain BPTC protection devices and which can form part of an automobile electrical system.

FIG. 8 is a cross-sectional schematic view of a junction box containing a power distribution node in which a power input line 7 feeds outgoing lines 71, 72 and 73 through BPTC devices 201, 202 and 203 which are mounted inside a container 2.

Figure 9:
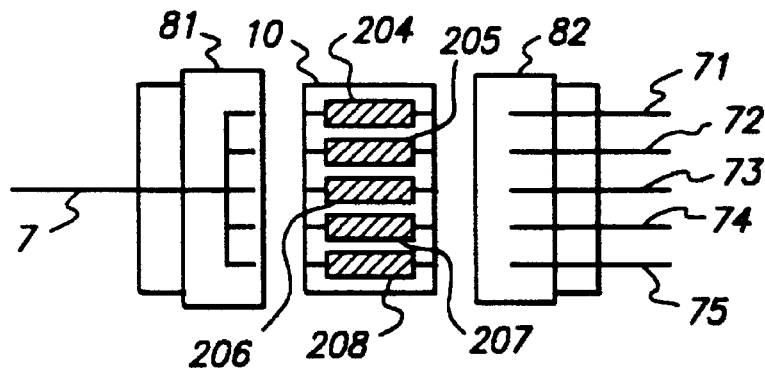

FIG. 9 is a cross-sectional schematic exploded view of a junction box containing a power distribution node. The box comprises a first cap section 81 in which power input line 7 is split into five terminals and a second cap section 82 in which five outgoing lines 71, 72, 73, 74 and 75 are formed with terminals. The two caps fit onto opposite ends of a center section 10 which contains five BPTC devices 204, 205, 206, 207, and 208, thus connecting the power input line to the outgoing lines through the BPTC devices.

Figure 10:
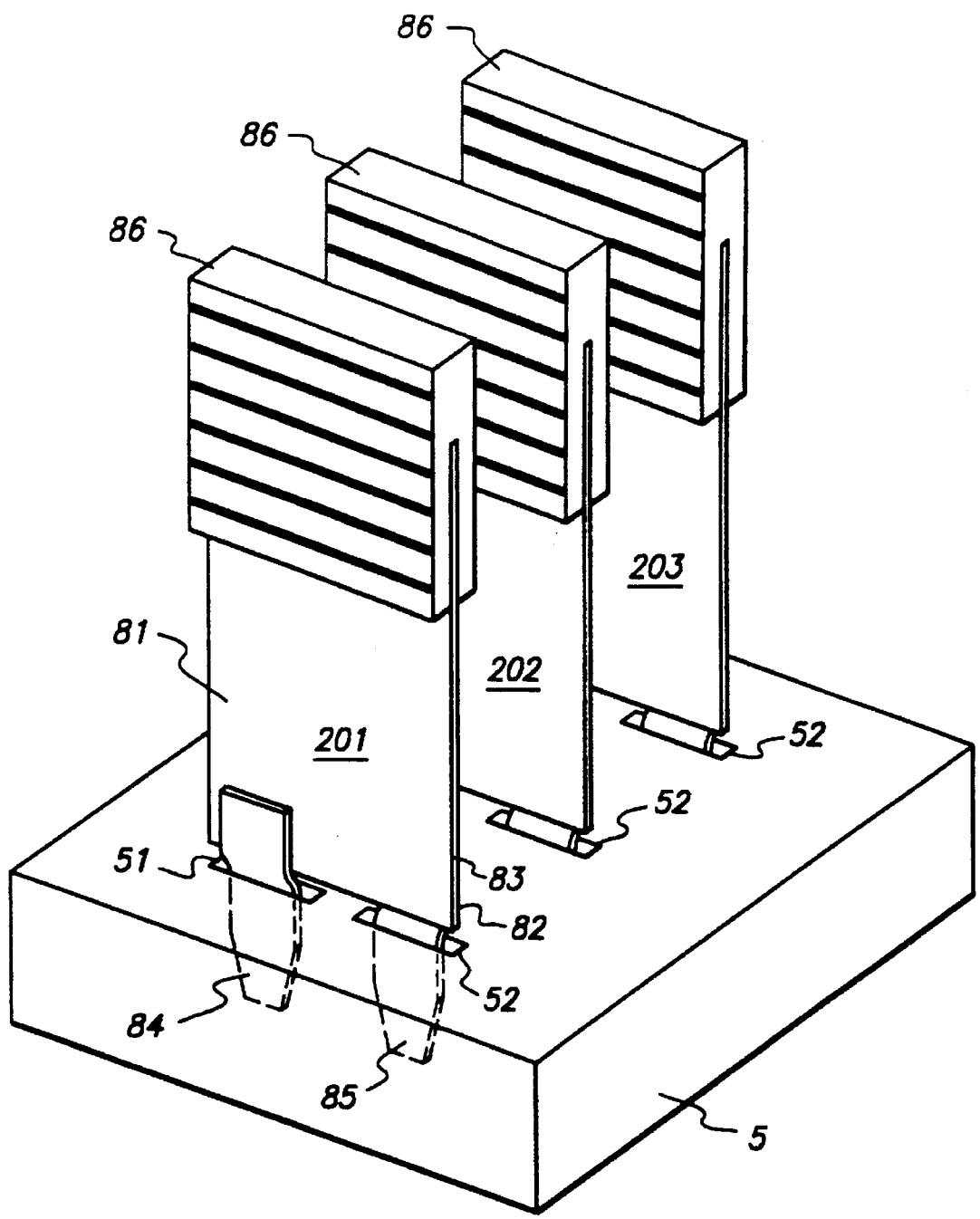
FIG. 10 illustrates BPTC devices which can be used in an automobile electrical system.

FIG. 10 shows part of the base 5 of a conventional fuse box which comprises sockets 51, 52 for fuses. Fitted into the sockets are BPTC devices 201, 202 and 203, which comprise laminar metal foil electrodes 81, 82 with a laminar conductive polymer PTC element 83 sandwiched between them. Leads 84 and 85 are soldered to foils 81 and 82 respectively at one end of the BPTC device and fit into the sockets 51, 52. At the opposite end of the device, insulating cap 86 fits over the PTC element and the metal foils so that the device can be easily handled.

Figure 11:
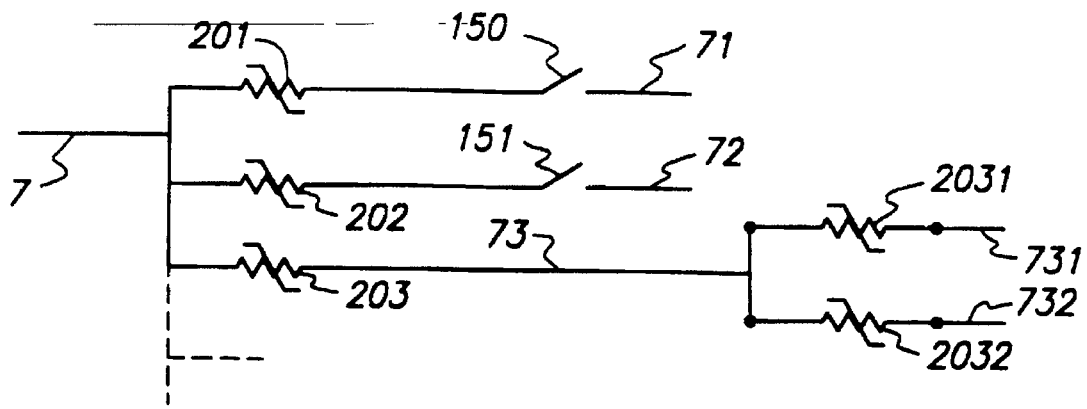
FIG. 11 shows a part of an electrical system of the invention which comprises a principal node and a sub-node.
Figure 12:
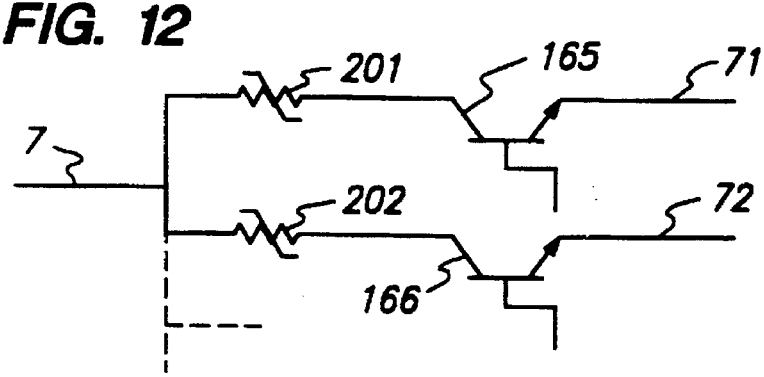
FIGS. 12 and 13 show a node in an electrical system of the invention in which a power input line is connected to a plurality of branch circuits through a corresponding plurality of electrical devices, namely silicon-controlled rectifiers in FIG. 12 and relays in FIG. 13.
Figure 13:
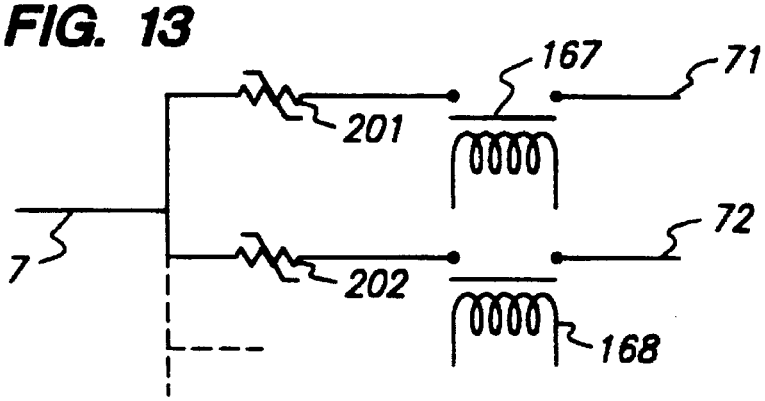

FIGS. 11, 12 and 13 are circuit diagrams for power distribution nodes between a power input line 7 and outgoing lines 71, 72, and 73 which are individually protected by BPTC devices 201, 202 and 203. In FIG. 11, outgoing line 73 extends to a sub-node between it and two outgoing lines 731 and 732 which are protected by BPTC devices 2031 and 2032, and lines 71 and 72 are controlled by make-and-break switches 150 and 151 respectively. In FIG. 12, lines 71 and 72 are controlled by bipolar transistors 165 and 166. In FIG. 13, lines 71 and 72 are controlled by relay switches 167 and 168 respectively.

Figure 14:
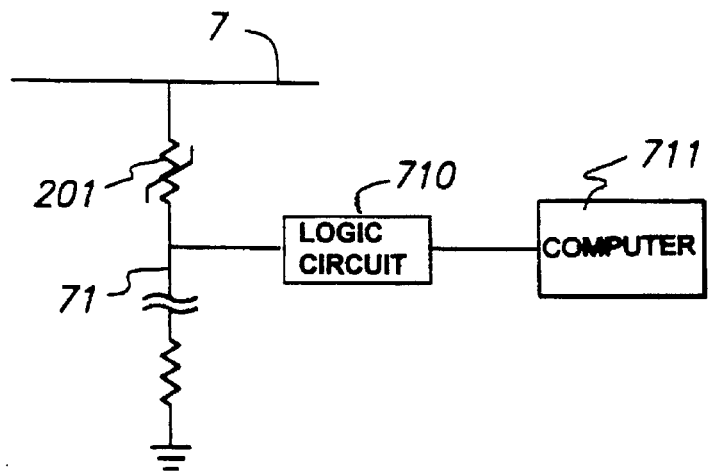
FIGS. 14, 15 and 16 show parts of systems of the invention in which the voltage on a line connecting a branch PTC device and an operative device is sensed and is used to indicate if the device is (or has been) in a tripped state.
Figure 15:
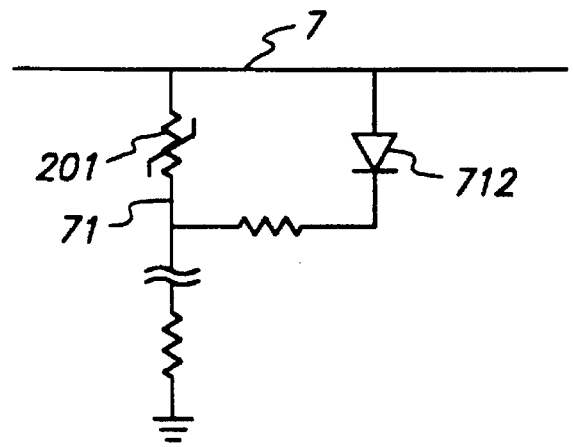
Figure 16:
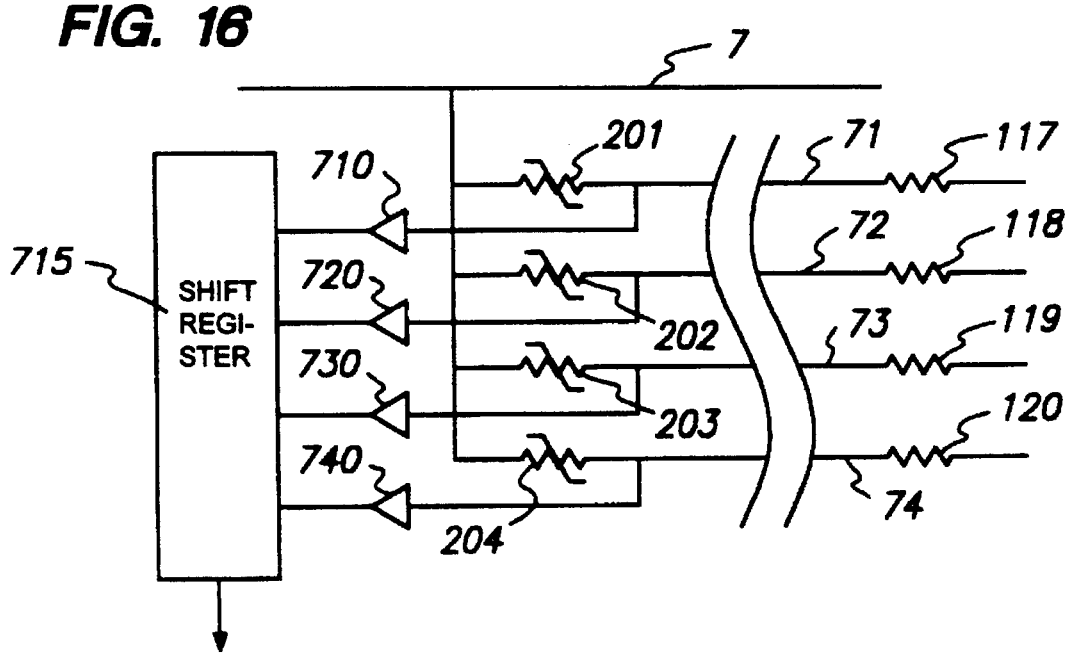

FIGS. 14, 15 and 16 are circuit diagrams for parts of systems in which a voltage sensor is used to sense the voltage on a line connecting a BPTC device to an operative device. An outgoing line 71, 72, 73 or 74 is connected through a BPTC device 201, 202, 203 or 204 to a power input line 7, and extends outwards to an operative device 117, 118, 119 or 120. Between the BPTC device and the operative device, a voltage sensor line is connected to the outgoing line. In FIG. 14, the voltage sensor line is connected to a logic circuit 710 which sends a logic signal to a computer 711 which processes the signal and indicates when the voltage on the line 71 drops below a certain level because the BPTC device 201 has tripped. In FIG. 15, the voltage sensor line is connected through a light emitting diode (LED) 712 to the power input line 7; the LED lights when the voltage on the line 71 drops below a certain level. FIG. 16 is similar to FIG. 14 but shows a plurality of outgoing lines 71, 72, 73 and 74 and a corresponding number of logic circuits 710, 720, 730 and 740 which feed signals to a clock-controlled shift register 715. The shift register produces a serial date stream indicating the state of the BPTC devices.

Figure 17:
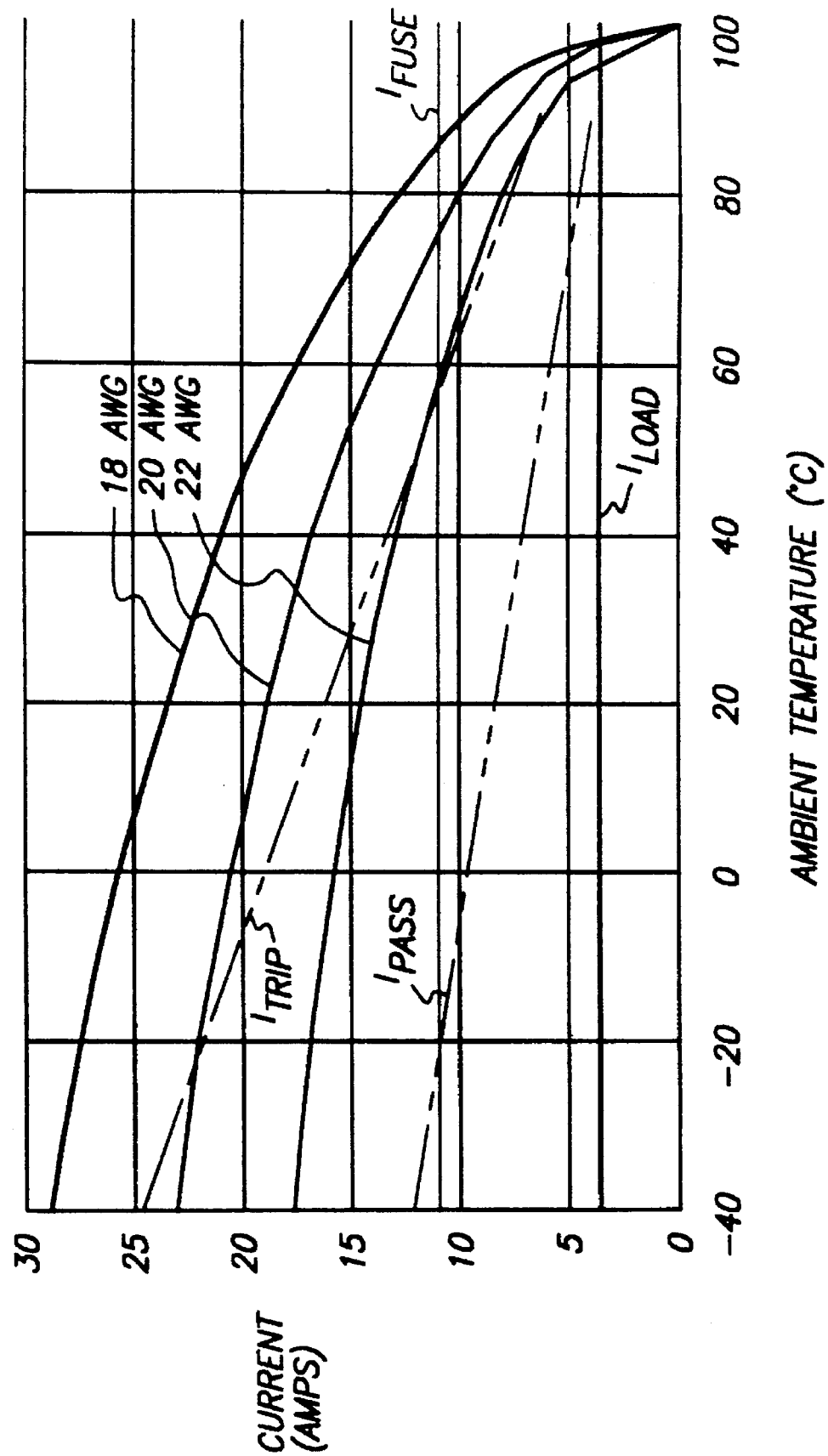
FIG. 17 shows the relationship between ambient temperature and the steady state currents which can be tolerated by various circuit components.

FIG. 17 shows the relationship between ambient temperature and (a) the steady state load current, $I_{LOAD}$, in a typical branch circuit of about 4 amps (b) the pass current, $I_{PASS}$, and the trip current, $I_{TRIP}$, of a typical BPTC device in which the PTC element is a conductive polymer containing polyethylene, and (c) the damage current for typical PVC-insulated wires of 18 AWG, 20 AWG and 22 AWG. It will be seen that at all ambient temperatures between −40° and about 75° C., the BPTC device will not be tripped by $I_{LOAD}$. Above about 75° C. the device will be tripped by $I_{LOAD}$, even though the insulated wires will not be damaged by $I_{LOAD}$ unless the ambient temperature is over 90° C. (so-called "nuisance tripping", because a normal load current trips the device although it is not necessary to do so to protect the circuit). It will also be seen that at all ambient temperatures between −40° and about 90° C., the BPTC device will protect the 18 AWG wire (since it will be tripped by fault currents which would damage the 18 AWG wire). However, it protects the 20 AWG wire only between about −20° and about 90° C., and the 22 AWG wire only between about 50° and 85° C.

As is made clear by FIG. 17, if the thermal derating curve had a lower slope, or if the spread between $I_{PASS}$ and $I_{TRIP}$ was lower, this would reduce the required wire size still further. PTC conductive polymers based on polyvinylidene fluoride typically have better thermal derating characteristics than those based on polyethylene.

Also shown on FIG. 17 is the current required to blow a fuse ($I_{FUSE}$) of the kind typically used in the prior art to protect a circuit having a steady state load current of about 4 amps but which is subject to much higher transient inrush currents. $I_{FUSE}$ is for example about 12 amps because the fuse must accept those inrush currents. This in turn means that it is necessary to use 18 AWG wire if the ambient temperature may be greater than about 80° C.

Figure 18:
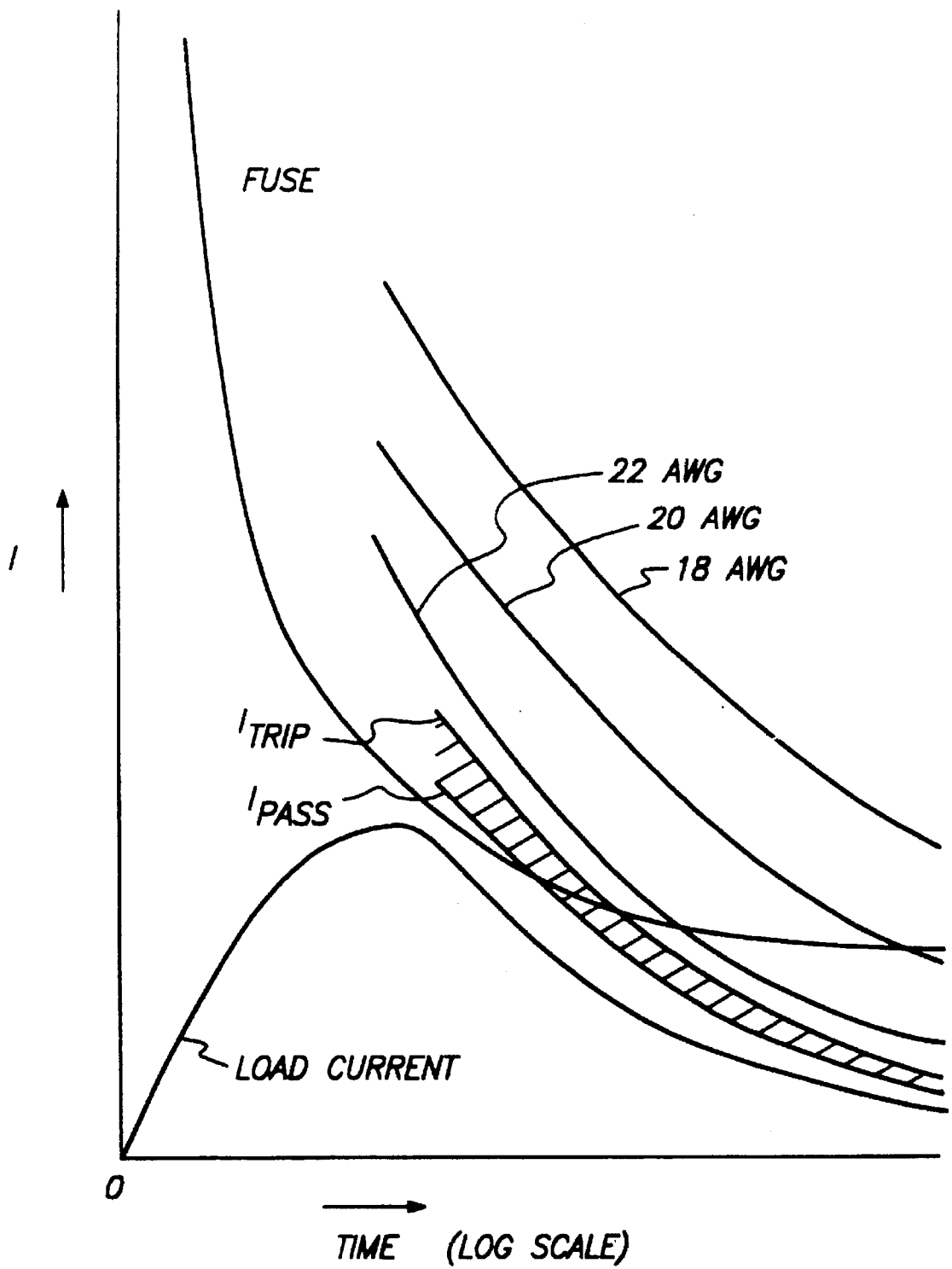
FIG. 18 shows the relationship between time and the transient currents which can be tolerated by various circuit components.

FIG. 18 shows diagrammatically the way in which the relationship between time (on a log scale) and (a) the load current in a circuit containing a motor or lamp or other device drawing an inrush current, (b) the current which will blow a fuse of the kind used in the prior art in such a circuit ($I_{FUSE(1)}$), (c) the current which will blow a fuse having, under steady state conditions, a current-carrying capacity similar to a PTC device ($I_{FUSE(2)}$), (d) the transient currents need to damage insulated 18, 20 and 22 AWG wires, and (e) the transient currents which will always be passed by ($I_{PASS}$), and which will always cause tripping of ($I_{TRIP}$), the devices in a typical batch of a particular type of PTC device. It will be seen that the very rapid response of the fuses to transient currents means that a fuse which will pass normal transient inrush currents will also pass a relatively high steady state current (well above the steady state load current, as in FIG. 17), and that this in turn means that the wiring in the circuit must be of 18 AWG size, or larger diameter. The PTC device, by contrast, reacts much more slowly than a fuse, and therefore permits the use of a wire of 20 AWG or even 22 AWG. A fuse having, under steady state conditions, a current-carrying capacity similar to the PTC device, will be blown by transient inrush currents which do not trip the PTC device.

What is claimed is:

1. An electrical system which is installed in a road vehicle, an airplane, or a ship, and which comprises
   (1) a source of electrical power;
   (2) a supply connection means which is electrically connected to a first pole of the power source, and which has, at its weakest current-carrying point, a current-carrying capacity of $I_{LINK}$ amps,
   (3) a return connection means which is electrically connected to a second pole of the power source; and
   (4) a plurality of branch circuits which are electrically connected in parallel between the supply connection means and the return connection means, at least two of the branch circuits being PTC-protected branch circuits, each of said branch circuits comprising
      (a) a branch PTC circuit protection device which
         (i) is electrically connected to the supply connection means directly or via at least one other PTC-protected branch circuit, and
         (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$;
      (b) an operative electrical device which is spaced apart from the branch PTC circuit protection device; and
      (c) an elongate PTC-protected branch connection means which (i) electrically connects the branch PTC device and the operative device, and (ii) has at all points a current-carrying capacity of at least $I_{DAMAGE}$ amps, $I_{DAMAGE}$ being more than $I_{TRIP}$;

whereby, if the PTC-protected branch connection means is accidentally connected to the first and second poles of the power source by connections which do not include the operative device, there is created a fault circuit which contains the branch PTC circuit protection device and in which the current is initially greater than $I_{TRIP}$, thus causing the branch PTC device to trip and reduce the current to a steady state value substantially below $I_{TRIP}$;

wherein at least one of the following conditions is fulfilled:

(A) in at least one of the PTC-protected branch circuits, (i) at all temperatures between 0° and 80° C. the $I_{PASS}$ of the branch PTC device in that PTC-protected branch circuit is at least 1.1 times $I_{LOAD}$, and (ii) at at least one temperature between –40° C. and 85° C., the $I_{PASS}$ of the branch PTC device in that PTC-protected branch circuit is at most 1.3 times $I_{LOAD}$, where $I_{LOAD}$ is the maximum steady state current in that PTC-protected branch circuit under normal operating conditions;

(B) in at least one of the PTC-protected branch circuits, (i) at all temperatures between 0° and 80° C., the $I_{DAMAGE}$ of the branch connection means in that PTC-protected branch circuit is at least 1.1 times the $I_{TRIP}$ of the branch PTC device in that PTC-protected branch circuit and (ii) at at least one temperature between –40° and 85° C., the $I_{DAMAGE}$ of the branch connection means in that PTC-protected branch circuit is at most 1.5 times the $I_{TRIP}$ of the branch PTC device in that PTC-protected branch circuit;

(C) the total number of PTC-protected branch circuits is p, and at all temperatures between 0° and 80° C., in q of the PTC-protected branch circuits, where q is at least 0.1 p, the $I_{DAMAGE}$ of the branch connection means in that PTC-protected branch circuit is equal to or lower than $I_{22}$, where $I_{22}$ is the $I_{DAMAGE}$ of PVC-insulated copper wire having a cross-sectional area of 0.324 mm$^2$ (22 AWG); or (D) some of the PTC-protected branch connection means are insulated copper wires having an $I_{DAMAGE}$ equal to or less than $I_{22}$, and some of the PTC-protected branch connection means are insulated copper wires having an $I_{DAMAGE}$ greater than $I_{22}$, where $I_{22}$ is the $I_{DAMAGE}$ of a PVC-insulated copper wire having a cross-sectional area of 0.324 mm$^2$ (22 AWG), and at all temperatures between 0° and 80° C., the total length of the PTC-protected branch connection means having an $I_{DAMAGE}$ greater than $I_{22}$ is not more than x times the total length of the PTC-protected branch connection means in which $I_{DAMAGE}$ is equal to or less than $I_{22}$, where x is 10.

2. A system according to claim 1 wherein at least one of the PTC-protected branch circuits comprises a switch which (i) can be operated to disconnect at least one of the PTC-protected branch circuits from the power source and (ii) is connected between the branch PTC device and the operative electrical device.

3. A system according to claim 2 wherein the switch comprises a relay, a field effect transistor, a bipolar solid state device or a silicon-controlled rectifier.

4. A system according to claim 1 which comprises at least one power distribution node which comprises a power input line and a plurality of outgoing lines, a plurality of said outgoing lines being electrically connected to the input line through a branch PTC protection device and being PTC-protected branch connection means of PTC-protected branch circuits.

5. A system according to claim 4 wherein the power input line and the outgoing lines are electrically connected to each other through a connection means selected from flexible printed circuits, printed circuit boards and metal fretts.

6. A circuit according to claim 5 wherein the branch PTC device is electrically connected in series with the connection means by means of a solder joint, or a weld, or an elastically deformed contact member, or a plastically deformed contact member.

7. A system according to claim 6 wherein the branch PTC devices, and the connections between the power input line, the branch PTC devices and the outgoing lines, are contained within a reopenable enclosure.

8. An electrical system according to claim 2 wherein at least one of the branch circuits is a fuse-protected or breaker-protected branch circuit which comprises (a) a fuse or circuit breaker which (i) is the weakest current-carrying point in the fuse-protected branch circuit, (ii) is electrically connected directly to the supply means, and (iii) disconnects the fuse-protected branch circuit if the current through it exceeds a value of $I_{FUSE}$ amps, $I_{FUSE}$ being less than $I_{LINK}$;

(b) an operative electrical device; and (c) a fused branch electrical connection means which (i) is electrically connected directly to the fuse or circuit breaker and to the operative device and (ii) has at all points a current-carrying capacity of $I_{FB}$ amps, $I_{FB}$ being more than $I_{FUSE}$.

9. An electrical system according to claim 2 wherein the supply means comprises (a) a principal supply means which is electrically connected directly to the power source and which contains a fuse or a circuit breaker which (i) is the weakest current-carrying point of the principal supply means, and (ii) has a current-carrying capacity of $I_{LINK}$ amps, and (b) a plurality of subsidiary supply means which are electrically connected to the principal supply means in parallel with each other, at least one of said subsidiary supply means (i) containing a subsidiary circuit protection device which is the weakest current-carrying point in the subsidiary supply means and which is converted into a high resistance state if the current in the subsidiary supply means exceeds a value $I_{SUB}$ amps and thus reduces the current to a value substantially below $I_{SUB}$, and (ii) being connected to a plurality of PTC-protected branch circuits, in each of which $I_{TRIP}$ is less than $I_{SUB}$.

10. An electrical system according to claim 1 wherein the PTC device contains a PTC element which is composed of a PTC conductive polymer.

11. An electrical system according to claim 10 wherein the PTC conductive polymer comprises a polymeric matrix comprising polyvinylidene fluoride and, dispersed in the polymeric matrix, carbon black.

12. An electrical system according to claim 2 which comprises two or more device enclosures, each of which
   (a) is composed of an electrically insulating material, and
   (b) contains a plurality of the PTC devices, each PTC device forming part of one of the PTC-protected branch circuits;

at least one of said device enclosures being separated from another of said device enclosures by a distance of at least 150 cm.

13. An electrical system according to claim 2 which is installed in a road vehicle, and wherein the power supply comprises a battery.

14. An electrical system according to claim 13 wherein at least one of the PTC-protected branch circuits contains a single PTC protection device and a plurality of operative devices which are electrically connected between the PTC protection device and the return means.

15. An electrical system according to claim 13 wherein there are p PTC-protected branch circuits, and in q of the PTC-protected branch circuits, where q is greater than 0.3 p, $I_{DAMAGE}$ is equal to or lower than $I_{22}$, where $I_{22}$ is the $I_{DAMAGE}$ of copper wire having a cross sectional area of 0.324 mm$^2$ (22 AWG).

16. An electrical system according to claim 13 which comprises at least four branch PTC protection devices located at at least two spaced-apart locations which are separated from each other by a distance of at least 50 cm.

17. An electrical system according to claim 13 wherein there are p PTC-protected branch circuits, and in r of the PTC protected branch circuits, where r is at least 0.75 p, the length of the PTC branch connection means is less than 200 cm.

18. An electrical system according to claim 2 wherein at least one of the PTC-protected branch circuits contains a second PTC circuit protection device which
   (i) is electrically connected in series with the operative device in that PTC-protected branch circuit, and
   (ii) is converted into a high temperature high resistance state if said operative device becomes excessively hot or if said operative device is operated for more than a predetermined time.

19. An electrical system according to claim 1 which further comprises a voltage sensor which senses the voltage at a point on the PTC-protected branch connection means and which, when the branch PTC circuit protection device is in the high temperature high resistance state, is capable of generating a visible light signal or a signal which can be fed to a computer.

20. An electrical system according to claim 1 wherein in at least one of the PTC-protected branch circuits
   (a) at all temperatures between −40° and +85° C.,
      (i) the $I_{PASS}$ of the branch PTC device in that circuit is at least 1.1 times the $I_{LOAD}$ in that PTC-protected branch circuit, and
      (ii) the $I_{DAMAGE}$ of the branch connection means in that PTC-protected branch circuit is at least 1.1 times the $I_{TRIP}$ of the branch PTC device in that circuit;
   (b) at at least one temperature between −40° and +85° C., the $I_{PASS}$ of the branch PTC device in that circuit is at most 1.5 times the $I_{LOAD}$, where $I_{LOAD}$ is the maximum steady state current in that PTC-protected branch circuit under normal operating conditions; and
   (c) at at least one temperature between −40° and +85° C., the $I_{DAMAGE}$ of the branch connection means in that PTC-protected branch circuit is at most 1.5 times the $I_{TRIP}$ of the branch PTC device in that circuit.

21. A system according to claim 1 wherein at least two of conditions (A), (B), (C) and (D) are fulfilled.

22. A system according to claim 1 wherein at least three of conditions (A), (B), (C) and (D) are fulfilled.

23. A system according to claim 1 wherein all of conditions (A), (B), (C) and (D) are fulfilled.

24. A system according to claim 1 which is installed in a road vehicle, and wherein
   (1) the power supply comprises a battery;
   (2) each of the branch PTC protection devices contains a PTC element which is composed of a conductive polymer; and
   (3) the total number of PTC-protected branch circuits is p, and at all temperatures between 0° and 80° C., in q of the PTC-protected branch circuits, where q is greater than 0.3 p, $I_{DAMAGE}$ is equal to or lower than $I_{22}$, where $I_{22}$ is the $I_{DAMAGE}$ of PVC-insulated copper wire having a cross-sectional area of 0.324 mm$^2$ (22 AWG).

25. A system according to claim 24 wherein in r of the PTC-protected branch circuits, where r is at least 0.75 p, the length of the PTC branch connection means is less than 200 cm.

26. A system according to claim 24 wherein condition (A) is fulfilled.

27. A system according to claim 24 wherein condition (B) is fulfilled.

28. An electrical system which is installed in a road vehicle, and which comprises
   (1) a battery;
   (2) a supply connection means which is electrically connected to a first pole of the battery, and which has, at its weakest current-carrying point, a current-carrying capacity of $I_{LINK}$ amps,
   (3) a return connection means which is electrically connected to a second pole of the battery; and
   (4) a plurality of PTC-protected branch circuits which are electrically connected in parallel between the supply connection means and the return connection means, each of said branch circuits comprising
      (a) a branch PTC circuit protection device which
         (i) is electrically connected to the supply connection means directly or via at least one other PTC-protected branch circuit,
         (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$, and
         (iii) contains a PTC element which is composed of a conductive polymer;
      (b) an operative electrical device which is spaced apart from the branch PTC circuit protection device; and
      (c) an elongate PTC-protected branch connection means which
         (i) electrically connects the branch PTC device and the operative device, and
         (ii) has at all points a current-carrying capacity of at least $I_{DAMAGE}$ amps, $I_{DAMAGE}$ being more than $I_{TRIP}$;
      whereby, if the PTC-protected branch connection means is accidentally connected to the first and second poles of the battery by connections which do not include the operative device, there is created a fault circuit which contains the branch PTC circuit protection device and in which the current is initially greater than $I_{TRIP}$, thus causing the branch PTC circuit protection device to trip and reduce the current to a steady state value substantially below $I_{TRIP}$; in which system, the total number of PTC-protected branch circuits is p, and at all temperatures between 0° and 80° C., in q of the PTC-protected branch circuits, where q is at least 0.1 p, the $I_{DAMAGE}$ of the branch connection means in that PTC-protected branch circuit is equal to or lower than $I_{22}$, where $I_{22}$ is the $I_{DAMAGE}$ of PVC-insulated copper wire having a cross-sectional area of 0.324 mm² (22 AWG).

29. An electrical system according to claim 28 wherein q is greater than 0.3 p.

30. An electrical system according to claim 28 wherein in r of the PTC protected branch circuits, where r is at least 0.75 p, the length of the PTC branch connection means is less than 200 cm.

31. An electrical system according to claim 28 which further comprises a voltage sensor which senses the voltage at a point on the PTC-protected branch connection means and which, when the branch PTC circuit protection device is in the high temperature high resistance state, is capable of generating a visible light signal or a signal which can be fed to a computer.

32. An electrical system according to claim 28 wherein at all temperatures between −40° and +85° C., q is at least 0.1 p.

33. An electrical system according to claim 28 wherein at all temperatures between −40° and +85° C., q is greater than 0.3 p.

34. An electrical system according to claim 28 wherein in at least one of the PTC-protected branch circuits,
  (i) at all temperatures between 0° and 80° C., the $I_{PASS}$ of the branch PTC device in that PTC-protected branch circuit is at least 1.1 times $I_{LOAD}$, and
  (ii) at at least one temperature between −40° and 85° C., the $I_{PASS}$ of the branch PTC device in that PTC-protected branch circuit is at most 1.3 times $I_{LOAD}$,
where $I_{LOAD}$ is the maximum steady state current in that PTC-protected branch circuit under normal operating conditions.

35. An electrical system according to claim 34 wherein in at least one of the PTC-protected branch circuits
  (a) at all temperatures between −40° and +85° C.,
    (i) $I_{PASS}$ is at least 1.1 times $I_{LOAD}$, and
    (ii) $I_{DAMAGE}$ is at least 1.1 times $I_{TRIP}$;
  (b) at at least one temperature between −40° and +85° C., $I_{PASS}$ is at most 1.5 times $I_{LOAD}$; and
  (c) at at least one temperature between −40° and +85° C., $I_{DAMAGE}$ is at most 1.5 times $I_{TRIP}$.

36. An electrical system according to claim 28 wherein in at least one of the PTC-protected branch circuits,
  (i) at all temperature between 0° and 80° C., the $I_{DAMAGE}$ of the branch connection means in that PTC-protected branch circuit is at least 1.1 times the $I_{TRIP}$ of the branch PTC device in that PTC-protected branch circuit, and
  (ii) at at least one temperature between −40° and +85° C., the $I_{DAMAGE}$ of the branch connection means in that PTC-protected branch circuit is at most 1.5 times the $I_{TRIP}$ of the branch PTC device in that PTC-protection branch circuit.

37. An electrical system according to claim 36 wherein in at least one of the PTC-protected branch circuits,
  (i) at all temperatures between −40° and 85° C., the $I_{PASS}$ of the branch PTC device in that PTC-protected branch circuit is at least 1.1 times $I_{LOAD}$, and
  (ii) at at least one temperature between 0° and 80° C., the $I_{PASS}$ of the branch PTC device in that PTC-protected branch circuit is at most 1.3 times $I_{LOAD}$.

38. An electrical system according to claim 36 wherein in at least one of the PTC-protected branch circuits,
  (i) at all temperatures between 0° and 80° C., the $I_{PASS}$ of the branch PTC device in that PTC-protected branch circuit is at least 1.2 times $I_{LOAD}$, and
  (ii) at at least one temperature between −40° and 85° C., the $I_{PASS}$ of the branch PTC device in that PTC-protected branch circuit is at most 1.1 times $I_{LOAD}$.

39. An electrical system according to claim 28 wherein in at least one of the PTC-protected branch circuits,
  (i) at all temperatures between 0° and 80° C., the $I_{DAMAGE}$ of the branch connection means in that PTC-protected branch circuit is at least 1.1 times the $I_{TRIP}$ of the branch PTC device in that PTC-protected branch circuit, and
  (ii) at at least one temperature between −40° and 85° C., the $I_{DAMAGE}$ of the branch connection means in that PTC-protected branch circuit is at most 1.5 times the $I_{TRIP}$ of the branch PTC device in that PTC-protected branch circuit.

40. An electrical system according to claim 39 wherein in at least one of the PTC-protected branch circuits,
  (i) at all temperatures between 0° and 80° C., the $I_{DAMAGE}$ of the branch connection means in that PTC-protected branch circuit is at least 1.2 times the $I_{TRIP}$ of the branch PTC device in that PTC-protected branch circuit, and
  (ii) at at least one temperature between −40° and 85° C., the $I_{DAMAGE}$ of the branch connection means in that PTC-protected branch circuit is at most 1.3 times the $I_{TRIP}$ of the branch PTC device in that PTC-protected branch circuit.

41. An electrical system according to claim 39 wherein in at least one of the PTC-protected branch circuits,
  (i) at all temperatures between −40° and 85° C., the $I_{DAMAGE}$ of the branch connection means in that PTC-protected branch circuit is at least 1.1 times the $I_{TRIP}$ of the branch PTC device in that PTC-protected branch circuit, and
  (ii) at at least one temperature between 0° and 80° C., the $I_{DAMAGE}$ of the branch connection means in that PTC-protected branch circuit is at most 1.5 times the $I_{TRIP}$ of the branch PTC device in that PTC-protected branch circuit.

42. An electrical system according to claim 28 wherein some of the PTC-protected branch connection means are insulated copper wires having an $I_{DAMAGE}$ equal to or less than $I_{22}$, and some of the PTC-protected branch connection means are insulated copper wires having an $I_{DAMAGE}$ greater than $I_{22}$, where $I_{22}$ is the $I_{DAMAGE}$ of a PVC-insulated copper wire having a cross-sectional area of 0.324 mm² (22 AWG), and at all temperatures between 0° and 80° C., the total length of the PTC-protected branch connection means having an $I_{DAMAGE}$ greater than $I_{22}$ is not more than x times the total length of the PTC-protected branch connection means in which $I_{DAMAGE}$ is equal to or less than $I_{22}$, where x is 10.

43. An electrical system which is installed in a road vehicle, and which comprises
  (1) a battery;
  (2) a supply connection means which is electrically connected to a first pole of the battery, and which has, at its weakest current-carrying point, a current-carrying capacity of $I_{LINK}$ amps, (3) a return connection means which is electrically connected to a second pole of the battery; and
(4) a plurality of PTC-protected branch circuits which are electrically connected in parallel between the supply connection means and the return connection means, each of said branch circuits comprising
  (a) a branch PTC circuit protection device which
    (i) is electrically connected to the supply connection means directly or via at least one other PTC-protected branch circuit,
    (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$, and
    (iii) contains a PTC element which is composed of a conductive polymer;
  (b) an operative electrical device which is spaced apart from the branch PTC circuit protection device; and
  (c) an elongate PTC-protected branch connection means which
    (i) electrically connects the branch PTC device and the operative device, and
    (ii) has at all points a current-carrying capacity of at least $I_{DAMAGE}$ amps, $I_{DAMAGE}$ being more than $I_{TRIP}$;
    whereby, if the PTC-protected branch connection means is accidentally connected to the first and second poles of the battery by connections which do not include the operative device, there is created a fault circuit which contains the branch PTC circuit protection device and in which the current is initially greater than $I_{TRIP}$, thus causing the branch PTC circuit protection device to trip and reduce the current to a steady state value substantially below $I_{TRIP}$;
in which system some of the PTC-protected branch connection means are insulated copper wires having an $I_{DAMAGE}$ equal to or less than $I_{22}$, and some of the PTC-protected branch connection means are insulated copper wires having an $I_{DAMAGE}$ greater than $I_{22}$, where $I_{22}$ is the $I_{DAMAGE}$ of a PVC-insulated copper wire having a cross-sectional area of 0.324 mm² (22 AWG), and at all temperatures between 0° and 80° C., the total length of the PTC-protected branch connection means having an $I_{DAMAGE}$ greater than $I_{22}$ is not more than x times the total length of the PTC-protected branch connection means in which $I_{DAMAGE}$ is equal to or less than $I_{22}$, where x is 10.

44. An electrical system according to claim 43 wherein x is 5.

45. An electrical system according to claim 43 wherein x is 2.

46. An electrical system which is installed in a road vehicle, and which comprises
(1) a battery;
(2) a supply connection means which is electrically connected to a first pole of the battery, and which has, at its weakest current-carrying point, a current-carrying capacity of $I_{LINK}$ amps,
(3) a realm connection means which is electrically connected to a second pole of the battery; and
(4) a plurality of PTC-protected branch circuits which are electrically connected in parallel between the supply connection means and the return connection means, each of said branch circuits comprising
  (a) a branch PTC circuit protection device which
    (i) is electrically connected to the supply connection means directly or via at least one other PTC-protected branch circuit,
    (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$, and
    (iii) contains a PTC element which is composed of a conductive polymer;
  (b) an operative electrical device which is spaced apart from the branch PTC circuit protection device; and
  (c) an elongate PTC-protected branch connection means which
    (i) electrically connects the branch PTC device and the operative device, and
    (ii) has at all points a current-carrying capacity of at least $I_{DAMAGE}$ amps, $I_{DAMAGE}$ being more than $I_{TRIP}$;
    whereby, if the PTC-protected branch connection means is accidentally connected to the first and second poles of the battery by connections which do not include the operative device, there is created a fault circuit which contains the branch PTC circuit protection device and in which the current is initially greater than $I_{TRIP}$, thus causing the branch PTC circuit protection device to trip and reduce the current to a steady state value substantially below $I_{TRIP}$;
in which system in at least one of the PTC-protected branch circuits,
  (i) at all temperatures between 0° and 80° C., the $I_{PASS}$ of the branch PTC device in that PTC-protected branch circuit is at least 1.1 times $I_{LOAD}$, and
  (ii) at at least one temperature between −40° and 85° C., the $I_{PASS}$ of the branch PTC device in that PTC-protected branch circuit is at most 1.3 times $I_{LOAD}$,
where $I_{LOAD}$ is the maximum steady state current in that PTC-protected branch circuit under normal operation conditions.

47. An electrical system according to claim 46 wherein in at least one of the PTC-protected branch circuits
  (a) at all temperatures between −40° and +85° C.,
    (i) $I_{PASS}$ is at least 1.1 times $I_{LOAD}$, and
    (ii) $I_{DAMAGE}$ is at least 1.1 times $I_{TRIP}$;
  (b) at at least one temperature between −40° and +85° C., $I_{PASS}$ is at most 1.5 times $I_{LOAD}$; and
  (c) at at least one temperature between −40° and +85° C., $I_{DAMAGE}$ is at most 1.5 times $I_{TRIP}$.

48. An electrical system according to claim 46 wherein in at least one of the PTC-protected branch circuits,
  (i) at all temperature between 0° and 80° C., the $I_{DAMAGE}$ of the branch connection means in that PTC-protected branch circuit is at least 1.1 times the $I_{TRIP}$ of the branch PTC device in that PTC-protected branch circuit, and
  (ii) at at least one temperature between −40° and +85° C., the $I_{DAMAGE}$ of the branch connection means in that PTC-protected branch circuit is at most 1.5 times the $I_{TRIP}$ of the branch PTC device in that PTC-protection branch circuit.

49. An electrical system which is installed in a road vehicle, and which comprises
(1) a battery;

(2) a supply connection means which is electrically connected to a first pole of the battery, and which has, at its weakest current-carrying point, a current-carrying capacity of $I_{LINK}$ amps, (3) a return connection means which is electrically connected to a second pole of the battery; and (4) a plurality of PTC-protected branch circuits which are electrically connected in parallel between the supply connection means and the return connection means, each of said branch circuits comprising (a) a branch PTC circuit protection device which
  (i) is electrically connected to the supply connection means directly or via at least one other PTC-protected branch circuit,
  (ii) is taken from a batch of PTC devices made by the same manufacturing process, the largest steady state current which will not cause any of the devices in the batch to trip being $I_{PASS}$ and the smallest steady state current which will cause all of the devices in the batch to trip being $I_{TRIP}$, $I_{TRIP}$ being less than $I_{LINK}$, and
  (iii) contains a PTC element which is composed of a conductive polymer;

(b) an operative electrical device which is spaced apart from the branch PTC circuit protection device; and (c) an elongate PTC-protected branch connection means which
  (i) electrically connects the branch PTC device and the operative device, and
  (ii) has at all points a current-carrying capacity of at least $I_{DAMAGE}$ amps, $I_{DAMAGE}$ being more than $I_{TRIP}$;

whereby, if the PTC-protected branch connection means is accidentally connected to the first and second poles of the battery by connections which do not include the operative device, there is created a fault circuit which contains the branch PTC circuit protection device and in which the current is initially greater than $I_{TRIP}$, thus causing the branch PTC circuit protection device to trip and reduce the current to a steady state value substantially below $I_{TRIP}$;

in which system in at least one of the PTC-protected branch circuits, (i) at all temperatures between 0° and 80° C., the $I_{DAMAGE}$ of the branch connection means in that PTC-protected branch circuit is at least 1.1 times the $I_{TRIP}$ of the branch PCT device in that PTC-protected branch circuit, and (ii) at at least one temperature between −40° and 85° C., the $I_{DAMAGE}$ of the branch connection means in that PTC-protected branch circuit is at most 1.5 times the $I_{TRIP}$, of the branch PTC device in that PTC-protected branch circuit.

50. An electrical system according to claim 49 wherein in at least one of the PTC-protected branch circuits, (i) at all temperatures between −40° and 85° C., the $I_{PASS}$ of the branch PTC device in that PTC-protected branch circuit is at least 1.1 times $I_{LOAD}$, and (ii) at at least one temperature between 0° and 80° C., the $I_{PASS}$ of the branch PTC device in that PTC-protected branch circuit is at most 1.3 times $I_{LOAD}$.

51. An electrical system according to claim 49 in at least one of the PTC-protected branch circuits, (ii) at at least one temperature between 0° and 80° C., the $I_{PASS}$ of the branch PTC device in that PTC-protected branch circuit is at most 1.3 times $I_{LOAD}$.

52. An electrical system according to claim 49 in at least one of the PTC-protected branch circuits, (i) at all temperatures between 0° and 80° C., the $I_{PASS}$ of the branch PTC device in that PTC-protected branch circuit is at least 1.2 times $I_{LOAD}$, and (ii) at at least one temperature between −40° and 85° C., the $I_{PASS}$ of the branch PTC device in that PTC-protected branch circuit is at most 1.1 times $I_{LOAD}$.

* * * * *

UNITED STATES PATENT AND TRADEMARK OFFICE

CERTIFICATE OF CORRECTION

PATENT NO. : 5,645,746

INVENTOR(S) : Malcolm R. Walsh

DATED : July 8, 1997

It is certified that error appears in the above-identified patent and that said Letters Patent is hereby corrected as shown below:

Column 1, line 60, replace "eg." by --e.g.--.

Column 2, line 66, delete "a" before "conventional".

Column 3, lines 5 to 6, replace "No. P 409 15 816." by --No. P 40 15 816.--.

Column 3, lines 13 to 14, replace "obtained. By the" by --obtained by matching the--.

Column 3, line 33, replace "eg." by --e.g.--.

Column 6, line 42, replace "system;" by --system of the invention;--.

Column 11, line 37, replace "lead" by --leads--.

Column 11, line 39, delete "by".

Claim 46, line 8, replace "realm" by --return--.

Claim 48, line 11, replace "protection" by --protected--.

Claim 51, lines 1 to 5, cancel entire claim.

Claim 52, line 1, replace "52" by --51-- and after "claim 49", insert --wherein--.

Signed and Sealed this

Ninth Day of September, 1997

Attest:

BRUCE LEHMAN

*Attesting Officer*       *Commissioner of Patents and Trademarks*